United States Patent
Hashimoto et al.

(10) Patent No.: US 11,066,083 B2
(45) Date of Patent: Jul. 20, 2021

(54) VEHICLE ALARM DEVICE AND VEHICLE ALARM METHOD

(71) Applicant: CLARION CO., LTD., Saitama (JP)

(72) Inventors: Takeshi Hashimoto, Motomiya (JP); Yasuhiro Fujita, Kashiwa (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/634,881

(22) PCT Filed: Aug. 2, 2018

(86) PCT No.: PCT/JP2018/029081
§ 371 (c)(1),
(2) Date: Jan. 29, 2020

(87) PCT Pub. No.: WO2019/027010
PCT Pub. Date: Feb. 7, 2019

(65) Prior Publication Data
US 2020/0239022 A1  Jul. 30, 2020

(30) Foreign Application Priority Data
Aug. 4, 2017 (JP) .............................. JP2017-151635

(51) Int. Cl.
*B60W 50/16* (2020.01)
*G08B 6/00* (2006.01)
(Continued)

(52) U.S. Cl.
CPC ............. *B60W 50/16* (2013.01); *G06F 3/016* (2013.01); *G08B 6/00* (2013.01); *G08B 23/00* (2013.01); *B60W 2050/143* (2013.01)

(58) Field of Classification Search
CPC .................................................... G60W 50/16
See application file for complete search history.

(56) References Cited

U.S. PATENT DOCUMENTS

2012/0232780 A1\* 9/2012 Delson ................. A63F 13/803
                                                                    701/400
2014/0292521 A1 10/2014 Perle
(Continued)

FOREIGN PATENT DOCUMENTS

JP        2004-345556       12/2004
JP        2006-143149        6/2006
(Continued)

OTHER PUBLICATIONS

International Search Report for corresponding International Application No. PCT/JP2018/029081, dated Oct. 23, 2018.
(Continued)

*Primary Examiner* — Joseph H Feild
*Assistant Examiner* — Pameshanand Mahase
(74) *Attorney, Agent, or Firm* — Mori & Ward, LLP

(57) ABSTRACT

To allow an alarm vibration generated by a vibration generator to be recognized by a user through a vibration transmission member. A vehicle alarm device (100) includes a vibration generator (30) configured to generate an alarm vibration having a frequency corresponding to a frequency of a received alarm signal, a vibration transmission member (90) configured to transmit the alarm vibration to a user, a travel situation information acquisition unit (70) configured to acquire travel situation information in accordance with a travel situation of the vehicle, and an alarm signal generator (70) configured to generate the alarm signal such that when the value of the acquired travel situation information is high, a signal to be inputted to the vibration generator (30) includes at least a high-band frequency and such that when the value of the travel situation information is low, the signal to be inputted to the vibration generator (30) includes at least a low-band frequency.

10 Claims, 21 Drawing Sheets

(51) Int. Cl.
  *G08B 23/00* (2006.01)
  *B60R 1/12* (2006.01)
  *B60R 1/00* (2006.01)
  *B60Q 9/00* (2006.01)
  *G06F 3/01* (2006.01)
  *B60W 50/14* (2020.01)

(56) References Cited

U.S. PATENT DOCUMENTS

| | | | |
|---|---|---|---|
| 2015/0109114 A1* | 4/2015 | Kariatsumari | B60Q 9/00 340/425.5 |
| 2016/0129920 A1 | 5/2016 | Hall et al. | |
| 2016/0147333 A1* | 5/2016 | Levesque | G06F 3/0447 345/161 |
| 2017/0089153 A1* | 3/2017 | Teodorescu | G01N 33/24 |
| 2018/0170255 A1* | 6/2018 | Hashimoto | H04R 9/18 |
| 2018/0345993 A1 | 12/2018 | Fujita et al. | |

FOREIGN PATENT DOCUMENTS

| | | |
|---|---|---|
| JP | 2007-065038 | 3/2007 |
| JP | 2008-072165 | 3/2008 |
| JP | 2008-129716 | 6/2008 |
| JP | 2017-100468 | 6/2017 |

OTHER PUBLICATIONS

Written Opinion for corresponding International Application No. PCT/JP2018/029081, dated Oct. 23, 2018.
Japanese Office Action for corresponding JP Application No. 2017-151635, dated May 21, 2019 (w/ machine translation).
Extended European Search Report for corresponding EP Application No. 18841963.4—1206, dated Jul. 10, 2020.

* cited by examiner

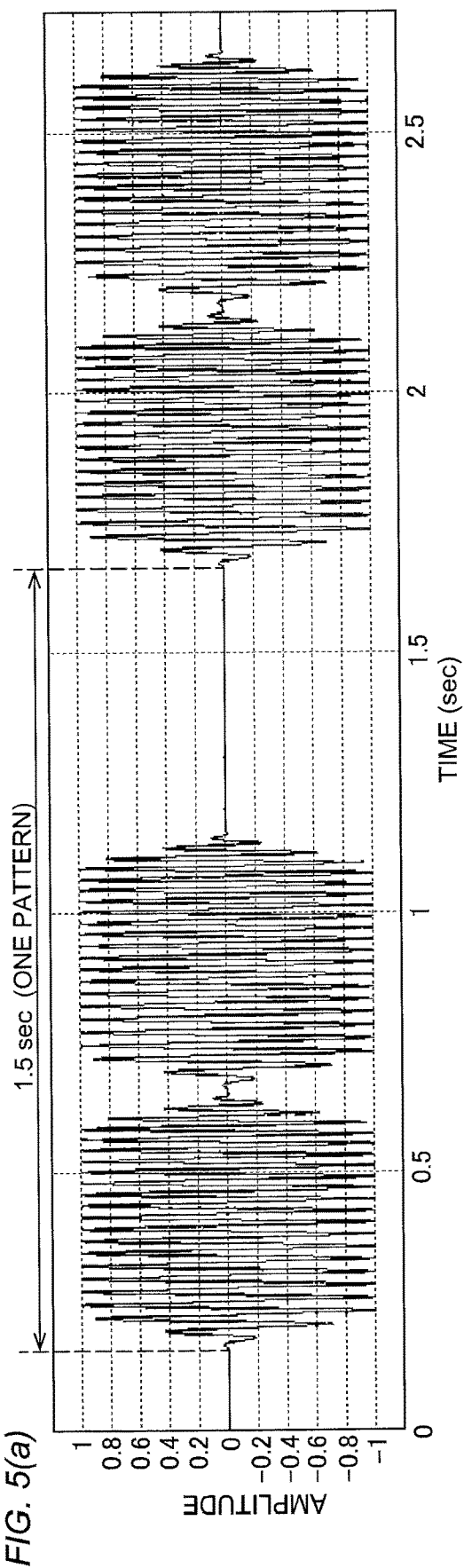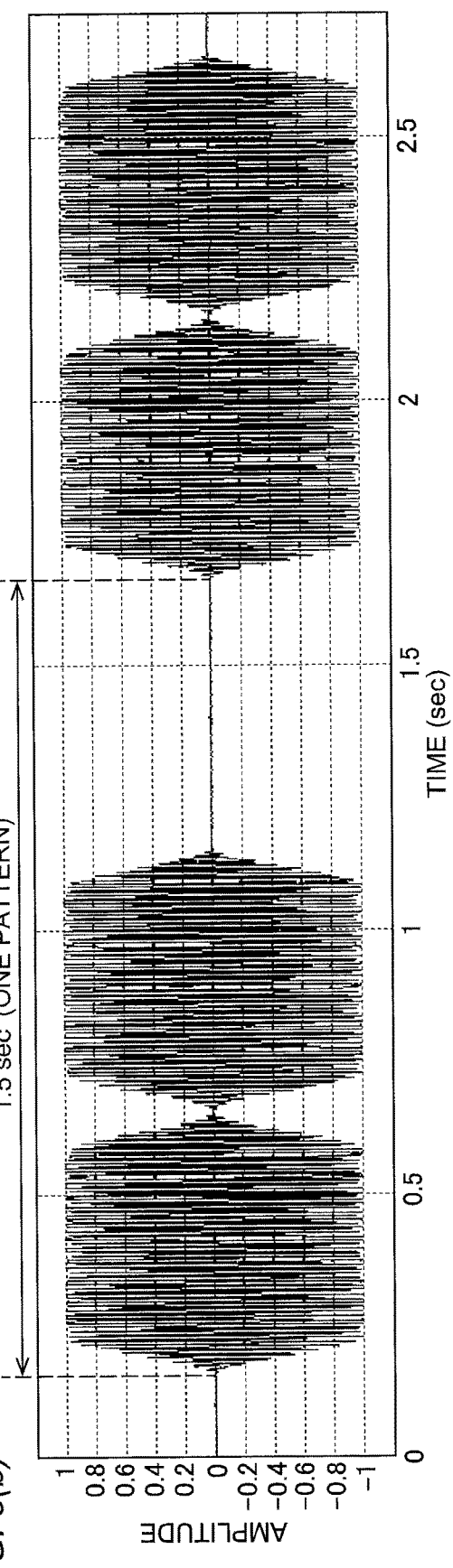

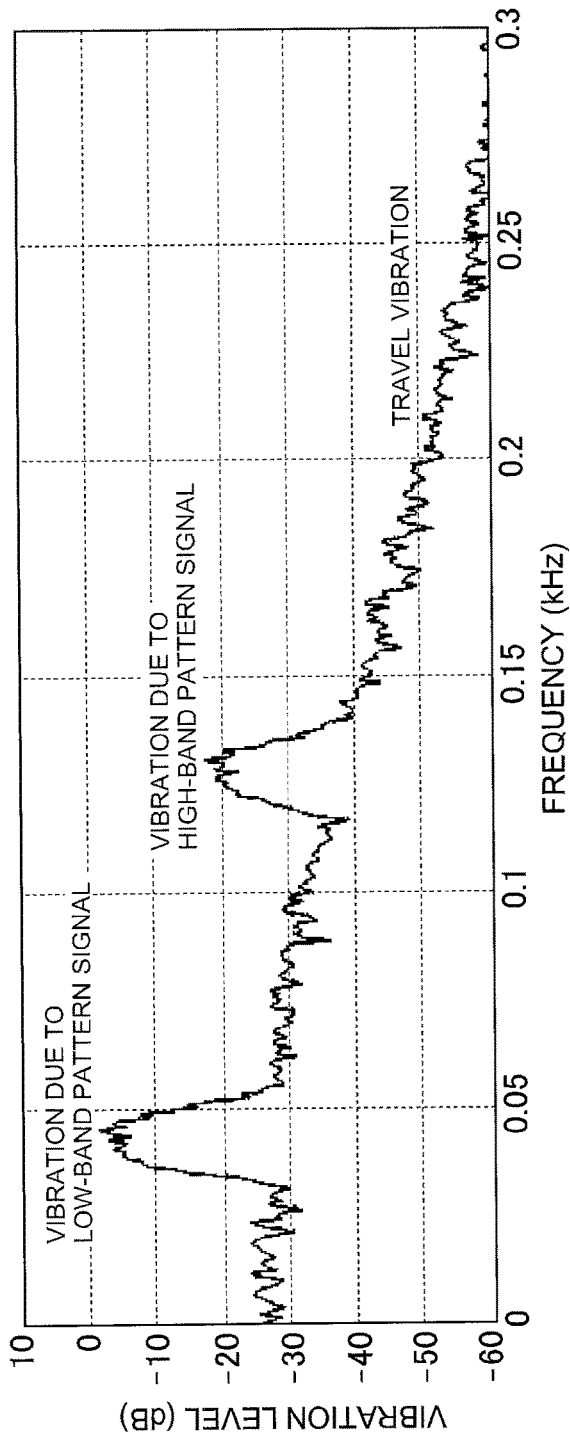
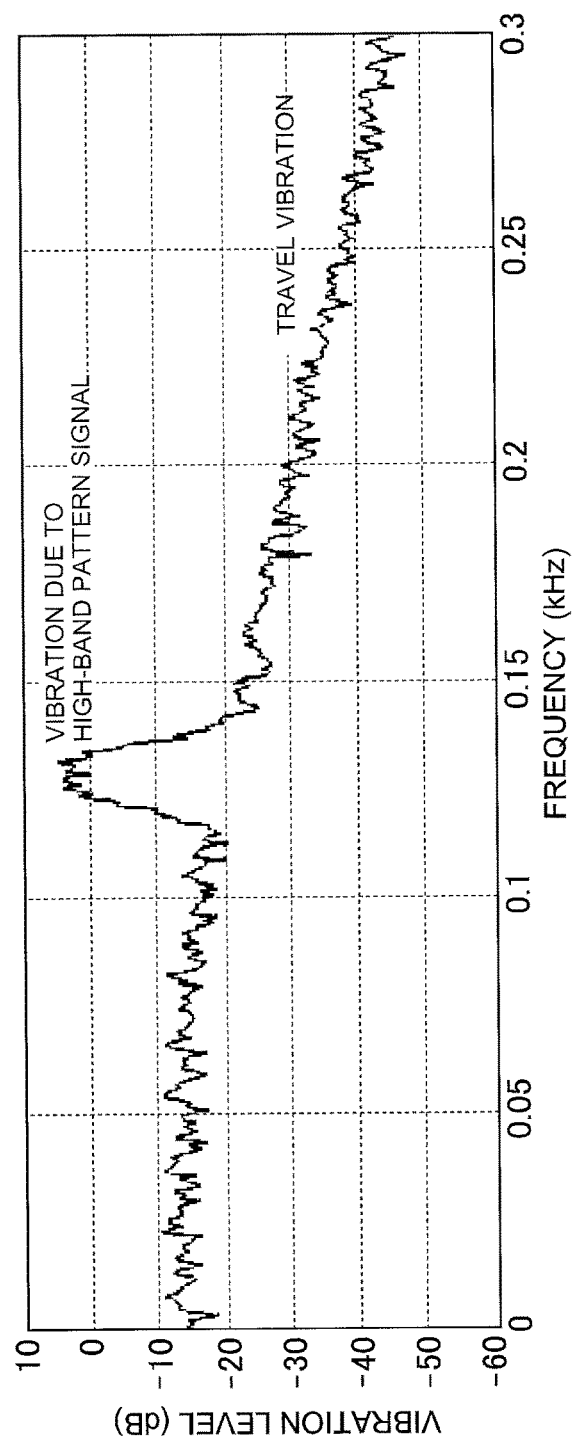
FIG. 7(a)
FIG. 7(b)

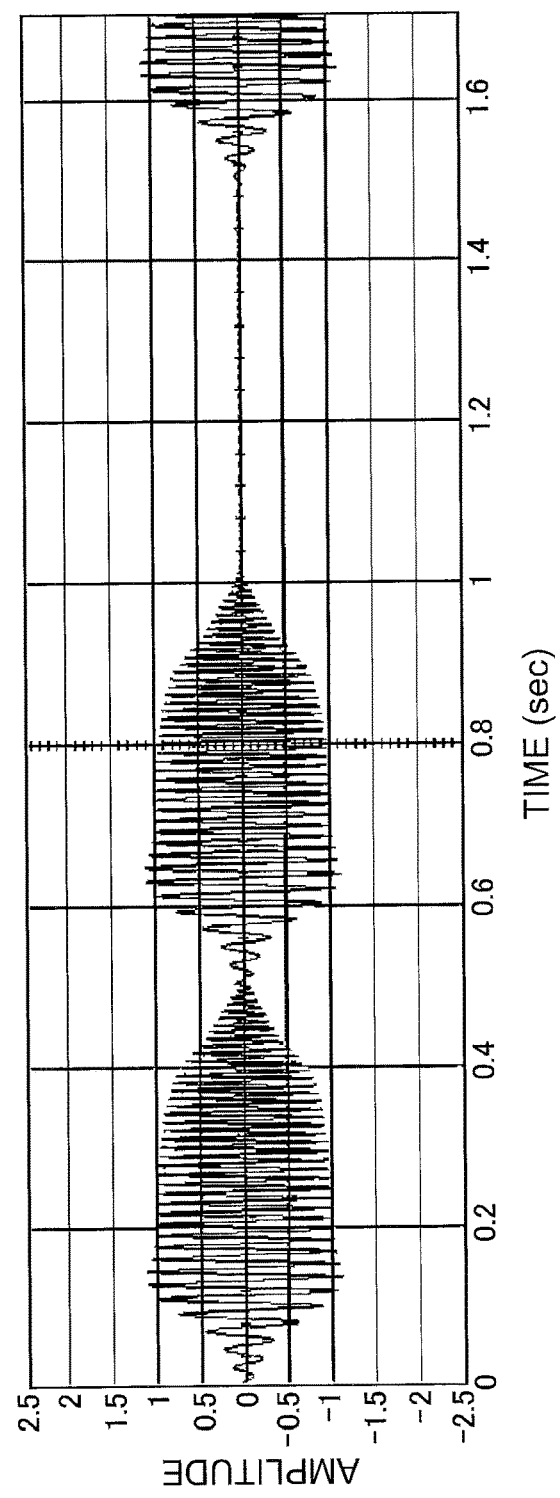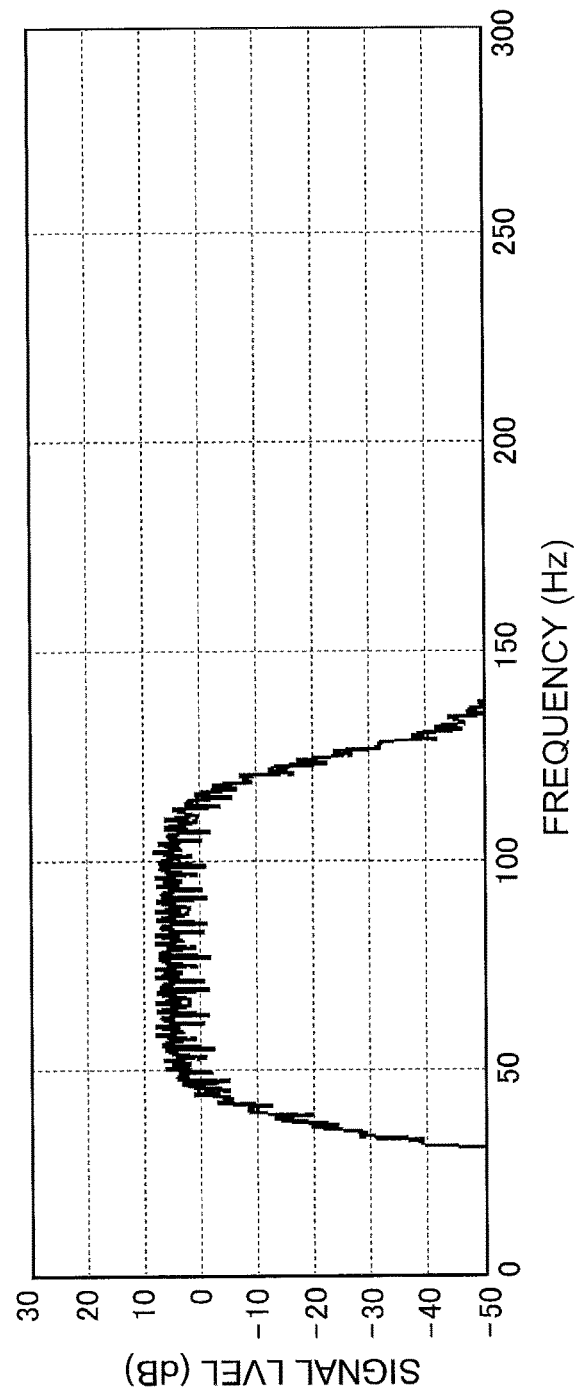
FIG. 18(a)
FIG. 18(b)

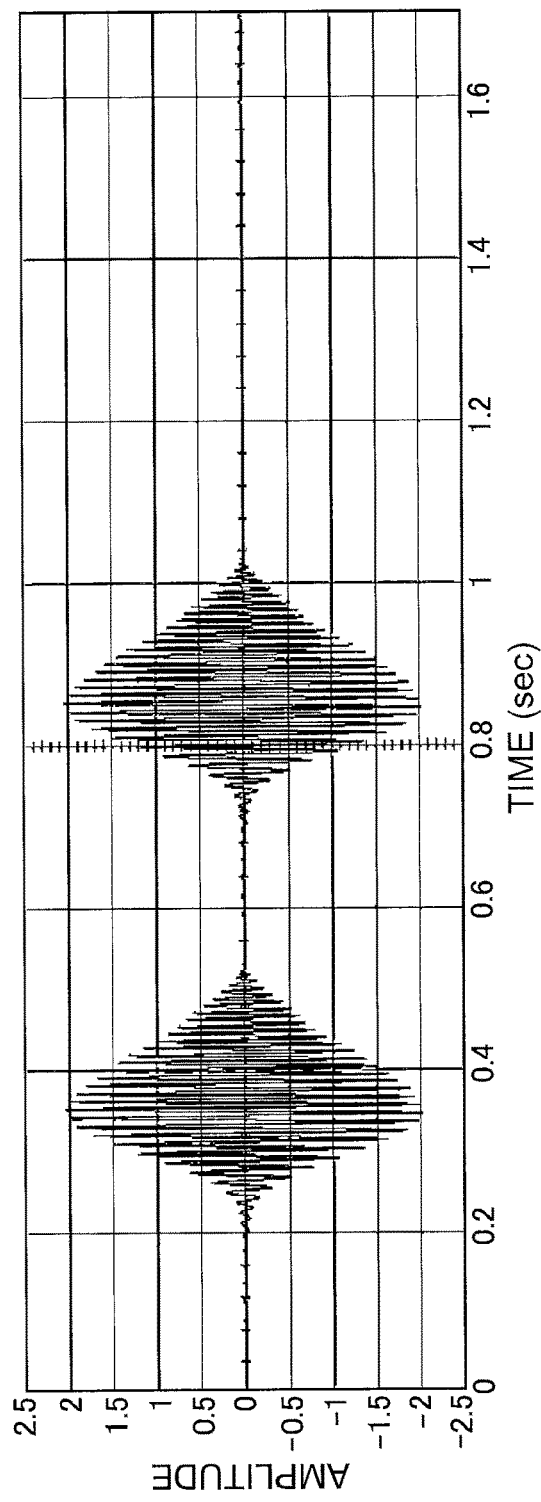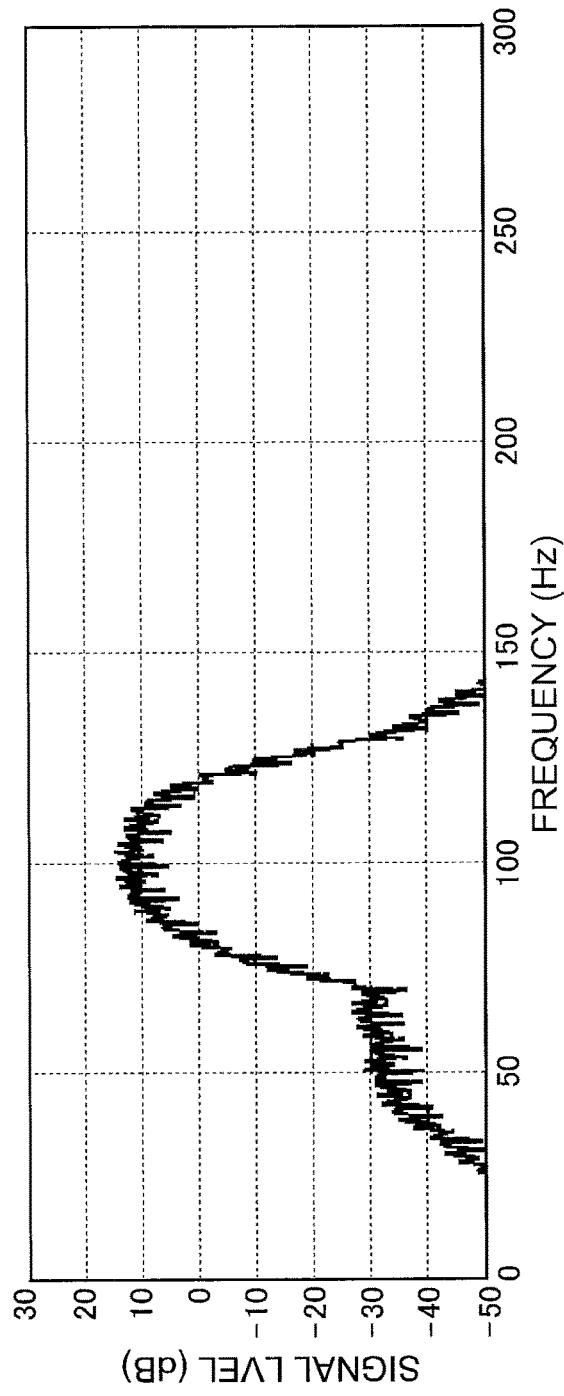
FIG. 19(a)
FIG. 19(b)

VEHICLE ALARM DEVICE AND VEHICLE ALARM METHOD

TECHNICAL FIELD

The present invention relates to a vehicle alarm device and vehicle alarm method and, more specifically, a vehicle alarm device and vehicle alarm method that alarm the user through an alarm vibration by outputting an alarm signal as a vibration from a vibration generator.

BACKGROUND ART

There have been known seat audio systems in which a speaker is installed in a vehicle seat (for example, see Patent Literature 1 and Patent Literature 2). A seat audio system includes a full-range speaker installed in the head rest or the like and a sub-woofer installed in the back rest or the like. A full-range speaker is a speaker suitable to reproduce low-to-high band sounds. A sub-woofer is a speaker suitable to reproduce a low band.

By embedding a sub-woofer in the back rest or the like, low-band signal components are outputted as a sound, as well as outputted as a vibration. A combination of the sound and vibration generated on the vehicle seat can increase the realism of the output sound.

On the other hand, there have been proposed methods in which a vibration outputted from a sub-woofer is used as a vehicle alarm device (for example, see Patent Literature 3). Such an alarm device alarms the driver through a vibration when the traveling vehicle departs from the lane. When alarming the driver using a vehicle alarm device, a combination of an alarm vibration and an alarm sound outputted from a sub-woofer can increase the degree of recognition of the alarm by the driver.

CITATION LIST

Patent Literature

PTL 1: Japanese Unexamined Patent Application Publication No. 2007-65038
PTL 2: Japanese Unexamined Patent Application Publication No. 2008-72165
PTL 3: Japanese Unexamined Patent Application Publication No. 2008-129716

SUMMARY OF INVENTION

Technical Problem

During travel of the vehicle, a road surface vibration, engine vibration, or the like is transmitted to the inside of the vehicle through the vehicle body. For this reason, the magnitude of an alarm vibration felt in the vehicle varies with the road surface situation, travel speed, engine revolutions per minute (RPM), or the like. For example, when the travel speed of the vehicle is high, an alarm vibration may be masked (buried and obscured) by a road surface vibration, engine vibration, or the like transmitted to the seat and thus the driver may not become aware of the alarm.

To prevent an alarm sound from being masked by noise or the like associated with travel of the vehicle, alarm devices have been proposed that change the volume level of an alarm sound in accordance with travel speed information of the vehicle or RPM information of the engine (for example, Japanese Unexamined Patent Application Publication No. 2004-345556). By changing the volume level of an alarm sound in accordance with the travel speed or the like of the vehicle, the user can be caused to recognize the alarm sound even if the travel speed is high.

It is conceivable that a technology that changes the volume level of an alarm sound in accordance with the travel speed of the vehicle will be applied to an alarm device that gives an alarm through a vibration generated by a speaker installed in the vehicle seat. However, when the road surface situation deteriorates or the travel speed, engine RPM, or the like is increased, the travel vibration tends to be increased in proportion to the deterioration of the road surface situation or the like. For this reason, even if the level of the alarm vibration is simply increased in accordance with the travel speed or the like of the vehicle, the alarm vibration is often masked by the increased travel vibration. As seen above, even if the level of the alarm vibration is simply increased, disadvantageously, it is not easy to cause the user to recognize the alarm vibration.

The present invention has been made in view of the above problems, and object thereof is to provide a vehicle alarm device and vehicle alarm method that alarm the user by generating a vibration and that are able to cause the user to recognize an alarm vibration even if the travel situation of the vehicle varies.

Solution to Problem

A vehicle alarm device according to one aspect of the present invention includes a vibration generator configured to generate an alarm vibration having a frequency corresponding to a frequency of a received alarm signal, a vibration transmission member configured to transmit the alarm vibration generated by the vibration generator to a user, a travel situation information acquisition unit configured to acquire travel situation information which is information that causes an increase or decrease in magnitude of a travel vibration in a vehicle, wherein when a value of the travel situation information increases or decreases in accordance with a travel situation of the vehicle, the magnitude of the travel vibration increases or decreases, and an alarm signal generator configured to generate the alarm signal such that when the value of the travel situation information acquired by the travel situation information acquisition unit is high, a signal to be inputted to the vibration generator includes at least a high-band frequency and such that when the value of the travel situation information acquired by the travel situation information acquisition unit is low, the signal to be inputted to the vibration generator includes at least a low-band frequency.

A vehicle alarm method according to another aspect of the present invention performed by a vehicle alarm device that generates an alarm vibration having a frequency corresponding to a frequency of a received alarm signal using a vibration generator and transmits the alarm vibration to a user through a vibration transmission member. The vehicle alarm method includes a travel situation information acquisition step of acquiring, by a travel situation information acquisition unit, travel situation information which is information that causes an increase or decrease in magnitude of a travel vibration in a vehicle, wherein when a value of the travel situation information increases or decreases in accordance with a travel situation of the vehicle, the magnitude of the travel vibration increases or decreases, an alarm signal generation step of generating, by an alarm signal generator, the alarm signal such that when the value of the travel situation information acquired in the travel situation information acquisition step is high, a signal to be inputted to the vibration generator includes at least a high-band frequency and such that when the value of the travel situation information acquired in the travel situation information acquisition step is low, the signal to be inputted to the vibration generator includes at least a low-band frequency, and an alarm vibration generation step of generating, by the vibration generator, the alarm vibration on the basis of the alarm signal generated in the alarm signal generation step.

In the vehicle alarm device and vehicle alarm method, the travel situation information is information that causes an increase or decrease in the magnitude of the travel vibration in the vehicle. When the value of the travel situation information increases or decreases in accordance with the travel situation of the vehicle, the magnitude of the travel vibration increases or decreases. Accordingly, when the value of the travel situation information is high, it can be determined that the travel vibration has been increased.

Typically, the level of a travel vibration at a low-band frequency tends to be higher than that of the travel vibration at a high-band frequency. Also, the entire level of a travel vibration that occurs when the value of the travel situation information is high tends to be higher than that of a travel vibration that occurs when the value of the travel situation information is low. Further, the entire level of a travel vibration tends to increase as the value of the travel situation information increases.

As seen above, the level of a travel vibration in a low frequency band tends to be higher than the level of the travel vibration in a high frequency band. Accordingly, if an alarm vibration is generated in a low frequency band when a travel vibration in a low frequency band is occurring, it is difficult to ensure a sufficient difference in level between the travel vibration and the alarm vibration. On the other hand, the level of a travel vibration in a high frequency band tends to be lower than the level of the travel vibration in a low frequency band. Accordingly, if an alarm vibration is generated in a high frequency band when a travel vibration in a low frequency band is occurring, a difference in level is easily ensured between the travel vibration and the alarm vibration.

When the value of the travel situation information is high, the vehicle alarm device and vehicle alarm method generate the alarm signal such that a signal to be inputted to the vibration generator includes at least a high-band frequency. For this reason, the frequency of the alarm vibration generated by the vibration generator on the basis of the alarm signal including at least the high-band frequency can be made higher than the frequency of the alarm vibration generated by the vibration generator on the basis of the alarm signal not including the high-band frequency. By generating the alarm vibration in a high frequency band, a difference in level is easily ensured between the travel vibration and the alarm vibration. Thus, even if the value of the travel situation information is high, the user can be caused to easily feel the alarm vibration due to the difference in level between the travel vibration and the alarm vibration and to recognize the occurrence of the alarm.

On the other hand, when the value of the travel situation information is low, the vehicle alarm device and vehicle alarm method according to the present invention generate the alarm signal such that the signal to be inputted to the vibration generator includes at least a low-band frequency. Thus, the frequency of the alarm vibration generated by the vibration generator on the basis of the alarm signal including at least the low-band frequency can be made lower than the frequency of the alarm vibration generated by the vibration generator on the basis of the alarm signal not including the low-band frequency.

When the value of the travel situation information is low, the entire level of the travel vibration tends to be low. For this reason, if the alarm vibration is generated in a low frequency band by the vibration generator when such a travel vibration is occurring, a difference in level is easily ensured between the travel vibration and the alarm vibration. The user can be caused to easily feel the alarm vibration due to the difference in level between the travel vibration and the alarm vibration and to recognize the occurrence of the alarm.

Note that if the frequency of the alarm vibration is set to a high frequency (e.g., a high-band frequency), the alarm vibration may be transmitted to the user not only as a vibration but also as a sound. However, when the value of the travel situation information increases, not only a travel vibration but also travel noise easily occurs. Accordingly, even if the alarm vibration is outputted as a sound, the sound of the alarm vibration is masked by the travel noise and reaches only the user, to whom the alarm vibration can be transmitted by the vibration transmission member. As a result, only the user can be caused to recognize the alarm vibration and alarm sound. Since the sound of the alarm vibration is masked by the travel noise or the like, a person other than the user can be prevented from becoming aware of the alarm vibration or alarm sound. On the other hand, if the frequency of the alarm vibration is set to a low frequency (e.g., low-band frequency), the alarm vibration remains only a vibration and therefore occurrence of a sound can be prevented.

In the vehicle alarm device and vehicle alarm method, the travel situation information may be one of a value of a travel speed of the vehicle, a value of engine revolutions per minute (RPM) of the vehicle, and a value of a vibration sensor detected in the vehicle.

In the vehicle alarm device and vehicle alarm method, the alarm signal generator acquires the travel situation information which is information that causes an increase or decrease in the magnitude of the travel vibration in the vehicle and whose value varies with the travel situation of the vehicle. The travel situation information may be the value of the travel speed of the vehicle, the value of engine RPM of the vehicle, or the value of a vibration sensor detected in the vehicle. Specifically, the travel situation information may be the vehicle speed, engine RPM, or the like always detected by a vehicle speed sensor, engine RPM detection sensor, or the like. The travel situation information may also be a travel vibration in the vehicle detected by a vibration sensor. The travel vibration tends to increase as the travel speed of the vehicle or the engine RPM increases. Also, when a larger value is detected by the vibration sensor, it can be determined that the travel vibration has increased.

In the vehicle alarm device, the vibration transmission member may have two or more resonant frequencies including at least a low-band resonant frequency and a high-band resonant frequency, and the alarm signal generator may generate the alarm signal by setting a frequency of the signal to be inputted to the vibration generator to the high-band resonant frequency when the value of the travel situation information acquired by the travel situation information acquisition unit is high and setting the frequency of the signal to be inputted to the vibration generator to the low-band resonant frequency when the value of the travel situation information acquired by the travel situation information acquisition unit is low.

In the vehicle alarm method, the vibration transmission member may have two or more resonant frequencies including at least a low-band resonant frequency and a high-band resonant frequency, and in the alarm signal generation step, the alarm signal generator may generate the alarm signal by setting a frequency of the signal to be inputted to the vibration generator to the high-band resonant frequency when the value of the travel situation information acquired in the travel situation information acquisition step is high and setting the frequency of the signal to be inputted to the vibration generator to the low-band resonant frequency when the value of the travel situation information acquired in the travel situation information acquisition step is low.

While the vehicle alarm device and vehicle alarm method transmit the alarm vibration generated by the vibration generator to the user through the vibration transmission member, vibration characteristics vary among vibration transmission members. For example, even if a high-level alarm signal is inputted to the vibration generator, one vibration transmission member may transmit a large alarm vibration to the user and another vibration transmission member may transmit a small vibration to the user. On the other hand, even if a low-level alarm signal is inputted to the vibration generator, one vibration transmission member may transmit a large alarm vibration to the user and another vibration transmission member may transmit a small vibration to the user. For this reason, even if the level of the alarm signal to be inputted to the vibration generator is simply changed in accordance with the value of the travel situation information, disadvantageously, it is not easy to transmit an alarm vibration having magnitude that allows the user to sufficiently recognize the alarm vibration, through the vibration transmission member.

When the value of the acquired travel situation information is high, the vehicle alarm device and vehicle alarm method set the frequency of the signal to be inputted to the vibration generator to the high-band resonant frequency; when the value of the travel situation information is low, the vehicle alarm device and vehicle alarm method set the frequency of the signal to be inputted to the vibration generator to the low-band resonant frequency. The low-band resonant frequency and high-band resonant frequency are frequencies that allow the vibration transmission member to amplify the vibration. By inputting the signal having the low-band resonant frequency or high-band resonant frequency to the vibration generator, a larger vibration can be transmitted to the user through the vibration transmission member. As a result, the user can be caused to easily feel the alarm vibration and to easily recognize the occurrence of the alarm.

In the vehicle alarm device, the vibration transmission member may have two or more resonant frequencies including at least a low-band resonant frequency and a high-band resonant frequency, the alarm signal generator may generate the alarm signal by combining a low-band signal, the low-band signal being obtained by setting a frequency of the signal to be inputted to the vibration generator to the low-band resonant frequency and weighting a level of the signal using the amount of weighting for a low band, and a high-band signal, the high-band signal being obtained by setting the frequency of the signal to be inputted to the vibration generator to the high-band resonant frequency and weighting the level of the signal using the amount of weighting for a high band, when the value of the travel situation information acquired by the travel situation information acquisition unit increases, the alarm signal generator may perform at least one of a process of reducing the amount of weighting for the low band in the weighting for the low band and a process of increasing the amount of weighting for the high band in the weighting for the high band, and when the value of the travel situation information acquired by the travel situation information acquisition unit decreases, the alarm signal generator may perform at least one of a process of increasing the amount of weighting for the low band in the weighting for the low band and a process of reducing the amount of weighing for the high band in the weighting for the high band.

In the vehicle alarm method, the vibration transmission member may have two or more resonant frequencies including at least a low-band resonant frequency and a high-band resonant frequency, in the alarm signal generation step, the alarm signal generator may generate the alarm signal by combining a low-band signal, the low-band signal being obtained by setting a frequency of the signal to be inputted to the vibration generator to the low-band resonant frequency and weighting a level of the signal using the amount of weighting for a low band, and a high-band signal, the high-band signal being obtained by setting the frequency of the signal to be inputted to the vibration generator to the high-band resonant frequency and weighting the level of the signal using the amount of weighting for a high band, when the value of the travel situation information acquired in the travel situation information acquisition step increases, the alarm signal generator may perform at least one of a process of reducing the amount of weighting for the low band in the weighting for the low band and a process of increasing the amount of weighting for the high band in the weighting for the high band, and when the value of the travel situation information acquired in the travel situation information acquisition step decreases, the alarm signal generator may perform at least one of a process of increasing the amount of weighting for the low band in the weighting for the low band and a process of reducing the amount of weighing for the high band in the weighting for the high band.

As described above, when the value of the travel situation information is high, the entire level of the travel vibration is high. Also, the level of the travel vibration at a low-band frequency is higher than that of the travel vibration at a high-band frequency. That is, the level of the travel vibration in a low frequency band is higher than that of the travel vibration in a high frequency band. Accordingly, if the alarm vibration is generated in a low frequency band when the travel vibration in a low-band frequency band is occurring, it is difficult to ensure a difference in level between the travel vibration and the alarm vibration. On the other hand, the level of the travel vibration in a high frequency band is lower than that of the travel vibration in a low frequency band. Accordingly, if the alarm vibration is generated in a high frequency band when the travel vibration in a high frequency band is occurring, a difference in level is easily ensured between the travel vibration and the alarm vibration.

When the value of the travel situation information increases, the vehicle alarm device and vehicle alarm method perform at least one of the process of reducing the amount of weighting for the low band in the weighting for the low band and the process of increasing the amount of weighting for the high band in the weighting for the high band. By reducing the amount of weighting for the low band, it is possible to suppress an alarm vibration including low-band frequency components, which have difficulty in ensuring a difference in level with respect to the travel vibration. Also, by increasing the amount of weighting for the high band, the frequency components of the alarm vibration can be changed from low-band frequency components to high-band frequency components, which easily ensure a difference in level with respect to the travel vibration. Thus, the user can be caused to easily feel the alarm vibration and to easily recognize the occurrence of the alarm.

In particular, by performing both of the process of reducing the amount of weighting for the low band and the process of increasing the amount of weighting for the high band in accordance with the value of the travel situation information, the strength of the vibration level can be smoothly changed from a low frequency band, in which a difference in level is less likely to occur between the travel vibration and the alarm vibration, to a high frequency band, in which a difference in level is more likely to occur between the travel vibration and the alarm vibration. Thus, the frequency range of the alarm vibration can be changed to a band in which the distinguishability of the alarm vibration by the user can be increased, without the user having a feeling of strangeness, and the user can be caused to easily recognize the occurrence of the alarm.

On the other hand, when the value of the travel situation information decreases, the vehicle alarm device and vehicle alarm method perform at least one of the process of increasing the amount of weighting for the low band in the weighting for the low band and the process of reducing the amount of weighting for the high band in the weighting for the high band. When the value of the travel situation information decreases, the entire level of the travel vibration tends to decrease. When such a travel vibration is occurring, even low-band frequency components easily ensure a difference in level with respect to the travel vibration. Accordingly, by reducing the amount of weighting for the high band, when an alarm vibration is generated at a high frequency (e.g., a high-band frequency), a sound which can be generated together with the vibration can be suppressed. Also, by increasing the amount of weighting for the low band, the frequency components of the alarm vibration can be changed from high-band frequency components to low-band frequency components, which easily ensure a difference in level with respect to the travel vibration. Thus, the user can be caused to easily feel the alarm vibration and to easily recognize the occurrence of the alarm.

In particular, by performing both of the process of increasing the amount of weighting for the low band and the process of increasing the amount of weighting for the high band in accordance with the value of the travel situation information when the value of the travel situation information decreases, the strength of the vibration level can be smoothly changed to a low frequency band, in which a difference in level is more likely to occur between the travel vibration and the alarm vibration. Thus, the frequency range of the alarm vibration can be changed to a band in which the distinguishability of the alarm vibration by the user can be increased, without the user having a feeling of strangeness, and the user can be caused to easily recognize the occurrence of the alarm.

In the vehicle alarm device and vehicle alarm method, the low-band signal may be a signal obtained by weighting, using the amount of weighting for the low band, the level of a low-band sweep signal obtained by sweeping the frequency in a predetermined frequency range including the low-band resonant frequency, and the high-band signal may be a signal obtained by weighting, using the amount of weighting for the high band, the level of a high-band sweep signal obtained by sweeping the frequency in a predetermined frequency range including the high-band resonant frequency.

The low-band signal is a signal including the low-band resonant frequency and therefore a larger vibration can be transmitted to the user through the vibration transmission member. Also, the high-band signal is a signal including the high-band resonant frequency and therefore a larger vibration can be transmitted to the user through the vibration transmission member.

Since the low-band signal and the high-band signal are sweep signals obtained by sweeping the frequency ranges including the resonant frequencies, the user can be caused to easily feel the alarm vibration and to easily recognize the occurrence of the alarm.

In the vehicle alarm device, the alarm signal generator may generate the alarm signal by extracting a band from a sweep signal obtained by sweeping the frequency in a frequency range in which the alarm vibration can be felt by the user, when the value of the travel situation information acquired by the travel situation information acquisition unit is high, the alarm signal generator may set a frequency range from which the band is to be extracted, to a high frequency range, and when the value of the travel situation information acquired by the travel situation information acquisition unit is low, the alarm signal generator may set the frequency range from which the band is to be extracted, to a low frequency range.

In the vehicle alarm method, in the alarm signal generation step, the alarm signal generator may generate the alarm signal by extracting a band from a sweep signal obtained by sweeping the frequency in a frequency range in which the alarm vibration can be felt by the user, when a value of the travel situation information acquired in the travel situation information acquisition step is high, the frequency range from which the band is to be extracted may be set to a high frequency range, and when the value of the travel situation information acquired in the travel situation information acquisition step is low, the frequency range from which the band is to be extracted may be set to a low frequency range.

As described above, if the alarm vibration is generated in a low frequency band when the value of the travel situation information is high, it is difficult to ensure a difference in level between the travel vibration and the alarm vibration. When the value of the acquired travel situation information is high, the vehicle alarm device and vehicle alarm method set the frequency range of the sweep signal from which the band is to be extracted, to a high frequency range. By setting the extraction range of the sweep signal to a high frequency range, it is possible to generate the alarm vibration including high-band frequency components, which easily ensure a difference in level with respect to the travel vibration. Thus, the user can be caused to easily feel the alarm vibration and to easily recognize the occurrence of the alarm.

On the other hand, when the value of the travel situation information is low, the vehicle alarm device and vehicle alarm method set the frequency range of the sweep signal from which the band is to be extracted, to a low frequency range. When the value of the travel situation information decreases, the entire level of the travel vibration tends to decrease. Even if the alarm vibration includes low-band frequency components, a difference in level is easily ensured between the travel vibration and the alarm vibration. Accordingly, by setting the extraction range of the sweep signal to a low frequency range, it is possible to generate the alarm vibration including low-band frequency components, which easily ensure a difference in level with respect to the travel vibration. Thus, the user can be caused to easily feel the alarm vibration and to easily recognize the occurrence of the alarm.

In the vehicle alarm device, when the value of the travel situation information acquired by the travel situation information acquisition unit increases, the alarm signal generator may change a value of a high band-side cutoff frequency in the frequency range from which the band is to be extracted, to a higher frequency, and when the value of the travel situation information acquired by the travel situation information acquisition unit decreases, the alarm signal generator may change the value of the high band-side cutoff frequency to a lower frequency.

The vehicle alarm method, in the alarm signal generation step, the alarm signal generator may change a value of a high band-side cutoff frequency in the frequency range from which the band is to be extracted, to a higher frequency when the value of the travel situation information acquired in the travel situation information acquisition step increases and may change the value of the high band-side cutoff frequency to a lower frequency when the value of the travel situation information acquired in the travel situation information acquisition step decreases.

When the value of the travel situation information increases, the value of the high band-side cutoff frequency in the frequency range of the sweep signal from which the band is to be extracted is changed to a higher frequency. Thus, it is possible to generate the alarm vibration including high-band frequency components, which easily ensure a difference in level between the travel vibration and the alarm vibration. As a result, the user can be caused to easily feel the alarm vibration and to easily recognize the occurrence of the alarm.

When the value of the travel situation information decreases, the entire level of the travel vibration tends to decrease. Even if the alarm vibration includes low-band frequency components, a difference in level is easily ensured between the travel vibration and the alarm vibration. Accordingly, when the value of the travel situation information decreases, the value of the high band-side cutoff frequency is changed to a lower frequency. Thus, the frequency range of the alarm vibration can be changed to a low frequency range, in which a difference in level is easily ensured. Also, by changing the value of the high band-side cutoff frequency to a lower frequency, it is possible to suppress generation of a sound in association with generation of the alarm vibration at a high frequency.

In the vehicle alarm device, when the value of the travel situation information acquired by the travel situation information acquisition unit increases, the alarm signal generator may change a value of a low band-side cutoff frequency in the frequency range from which the band is to be extracted, to a higher frequency, and when the value of the travel situation information acquired by the travel situation information acquisition unit decreases, the alarm signal generator may change the value of the low band-side cutoff frequency to a lower frequency.

In the vehicle alarm method, in the alarm signal generation step, the alarm signal generator may change a value of a low band-side cutoff frequency in the frequency range from which the band is to be extracted, to a higher frequency when the value of the travel situation information acquired in the travel situation information acquisition step increases and may change the value of the low band-side cutoff frequency to a lower frequency when the value of the travel situation information acquired in the travel situation information acquisition step decreases.

When the value of the travel situation information increases, the value of the low band-side cutoff frequency in the frequency range of the sweep signal from which the band is to be extracted is changed to a higher frequency range. Thus, the frequency range of the alarm vibration can be changed to a high frequency range, in which a difference in level is easily ensured between the travel vibration and the alarm vibration. As a result, the user can be caused to easily feel the alarm vibration and to easily recognize the occurrence of the alarm.

When the value of the travel situation information decreases, the entire level of the travel vibration tends to decrease. Even if the alarm vibration includes low-band frequency components, a difference in level is easily ensured between the travel vibration and the alarm vibration. Accordingly, when the value of the travel situation information decreases, the value of the low band-side cutoff frequency is changed to a lower frequency. Thus, it is possible to generate the alarm vibration including low-band frequency components, which easily ensure a difference in level with respect to the travel vibration.

In the vehicle alarm device, the alarm signal generator may generate the alarm signal on the basis of the sweep signal obtained by sweeping the frequency in a frequency range in which the alarm vibration can be felt by the user, when the value of the travel situation information acquired by the travel situation information acquisition unit is high, the alarm signal generator may set the level of the sweep signal in a high band to a higher level than the signal levels in other ranges, and when the value of the travel situation information is low, the alarm signal generator may set the level of the sweep signal in a low band to a higher level than the signal levels in other ranges.

In the vehicle alarm method, in the alarm signal generation step, the alarm signal generator may generate the alarm signal on the basis of a sweep signal obtained by sweeping the frequency in a frequency range in which the alarm vibration can be felt by the user, when the value of the travel situation information acquired in the travel situation information acquisition step is high, the alarm signal generator may set the level of the sweep signal in a high band to a higher level than the signal levels in other ranges, and when the value of the travel situation information is low, the alarm signal generator may set the level of the sweep signal in a low band to a higher level than the signal levels in other ranges.

As described above, if the alarm vibration is generated in a low frequency band when the value of the travel situation information is high, it is difficult to ensure a difference in level between the travel vibration and the alarm vibration. When the value of the acquired travel situation information is high, the vehicle alarm device and vehicle alarm method set the level of the sweep signal in a high band to a higher level than the signal levels in other ranges. By setting the level of the sweep signal in a high band to a higher signal level, it is possible to generate, as a larger vibration, the alarm vibration including high-band frequency components, which easily ensure a difference in level with respect to the travel vibration. Thus, the user can be caused to easily feel the alarm vibration and to easily recognize the occurrence of the alarm.

On the other hand, when the value of the travel situation information is low, the vehicle alarm device and vehicle alarm method set the low-band signal level to a higher level than signal levels in other ranges. When the value of the travel situation information is low, the entire level of the travel vibration tends to be low. Even if the alarm vibration includes low-band frequency components, a difference in level is easily ensured between the travel vibration and the alarm vibration. Accordingly, by setting the level of the sweep signal in a low band to a higher level than the signal levels in other ranges, it is possible to generate, as a larger vibration, the alarm vibration including low-band frequency components, which easily ensure a difference in level with respect to the travel vibration. Thus, the user can be caused to easily feel the alarm vibration and to easily recognize the occurrence of the alarm.

In the vehicle alarm device, the alarm signal generator may adjust a level of the alarm signal so that the level does not exceed a level of a vibration that the vibration generator is capable of generating.

In the vehicle alarm method, in the alarm signal generation step, the alarm signal generator may adjust a level of the alarm signal so that the level does not exceed a level of a vibration that the vibration generator is capable of generating.

For example, if the level of the alarm signal to be inputted to the vibration generator is set to an excessively high level, a distortion sound or the like may be generated by the vibration generator. The vehicle alarm device and vehicle alarm method adjust the level of the alarm signal to be inputted to the vibration generator so that the level does not exceed the level of a vibration that the vibration generator is capable of generating. Thus, the alarm vibration having a sufficient level can be generated without causing distortion or the like in the vibration, and the user can be caused to easily recognize the occurrence of the alarm.

In the vehicle alarm device and vehicle alarm method, the vibration transmission member may be the vehicle seat for the user to sit thereon, and the vibration generator may be installed in the vehicle seat.

In the vehicle alarm device and vehicle alarm method, by using the vehicle seat for the user to sit thereon as the vibration transmission member, it is possible to surely transmit a vibration to the user during travel of the vehicle.

Advantageous Effects of Invention

According to an embodiment of the present invention of a vehicle alarm device and vehicle alarm method, when the value of the travel situation information is high, the vehicle alarm device and vehicle alarm method generate the alarm signal such that a signal to be inputted to the vibration generator includes at least a high-band frequency. For this reason, the frequency of the alarm vibration generated by the vibration generator on the basis of the alarm signal including at least the high-band frequency can be made higher than the frequency of the alarm vibration generated by the vibration generator on the basis of the alarm signal not including the high-band frequency. By generating the alarm vibration in a high frequency band, a difference in level is easily ensured between the travel vibration and the alarm vibration. Thus, even if the value of the travel situation information is high, the user can be caused to easily feel the alarm vibration due to the difference in level between the travel vibration and the alarm vibration and to recognize the occurrence of the alarm.

According to another embodiment of the present invention of a vehicle alarm device and vehicle alarm method, when the value of the travel situation information is low, the vehicle alarm device and vehicle alarm method generate the alarm signal such that the signal to be inputted to the vibration generator includes at least a low-band frequency. Thus, the frequency of the alarm vibration generated by the vibration generator on the basis of the alarm signal including at least the low-band frequency can be made lower than the frequency of the alarm vibration generated by the vibration generator on the basis of the alarm signal not including the low-band frequency.

When the value of the travel situation information is low, the entire level of the travel vibration tends to be low. For this reason, if the alarm vibration is generated in a low frequency band by the vibration generator when such a travel vibration is occurring, a difference in level is easily ensured between the travel vibration and the alarm vibration. The user can be caused to easily feel the alarm vibration due to the difference in level between the travel vibration and the alarm vibration and to recognize the occurrence of the alarm.

BRIEF DESCRIPTION OF DRAWINGS

FIG. 5($a$) is a graph showing amplitude characteristics of a low-band pattern signal according to the first embodiment, and FIG. 5($b$) is a graph showing amplitude characteristics of a high-band pattern signal according to the first embodiment;

FIG. 7($a$) is a graph showing frequency characteristics of a vibration generated on the vehicle seat on the basis of an alarm signal when the travel speed of the vehicle is 30 km/h, and FIG. 7($b$) is a graph showing frequency characteristics of a vibration generated on the vehicle seat on the basis of an alarm signal when the travel speed of the vehicle is 100 km/h;

FIG. 18(a) is a graph showing amplitude characteristics of an extracted sweep signal obtained by extracting a frequency band on the basis of the amounts of change of the cutoff frequencies shown in FIG. 17(a) when the travel speed is 100 km/h, and FIG. 18(b) is a graph showing frequency characteristics;

FIG. 19(a) is a graph showing amplitude characteristics of a weighted sweep signal obtained by weighting the extracted sweep signal shown in FIG. 16(a) when the travel speed is 100 km/h, and FIG. 19(b) is a graph showing frequency characteristics;

DESCRIPTION OF EMBODIMENTS

Figure 1:
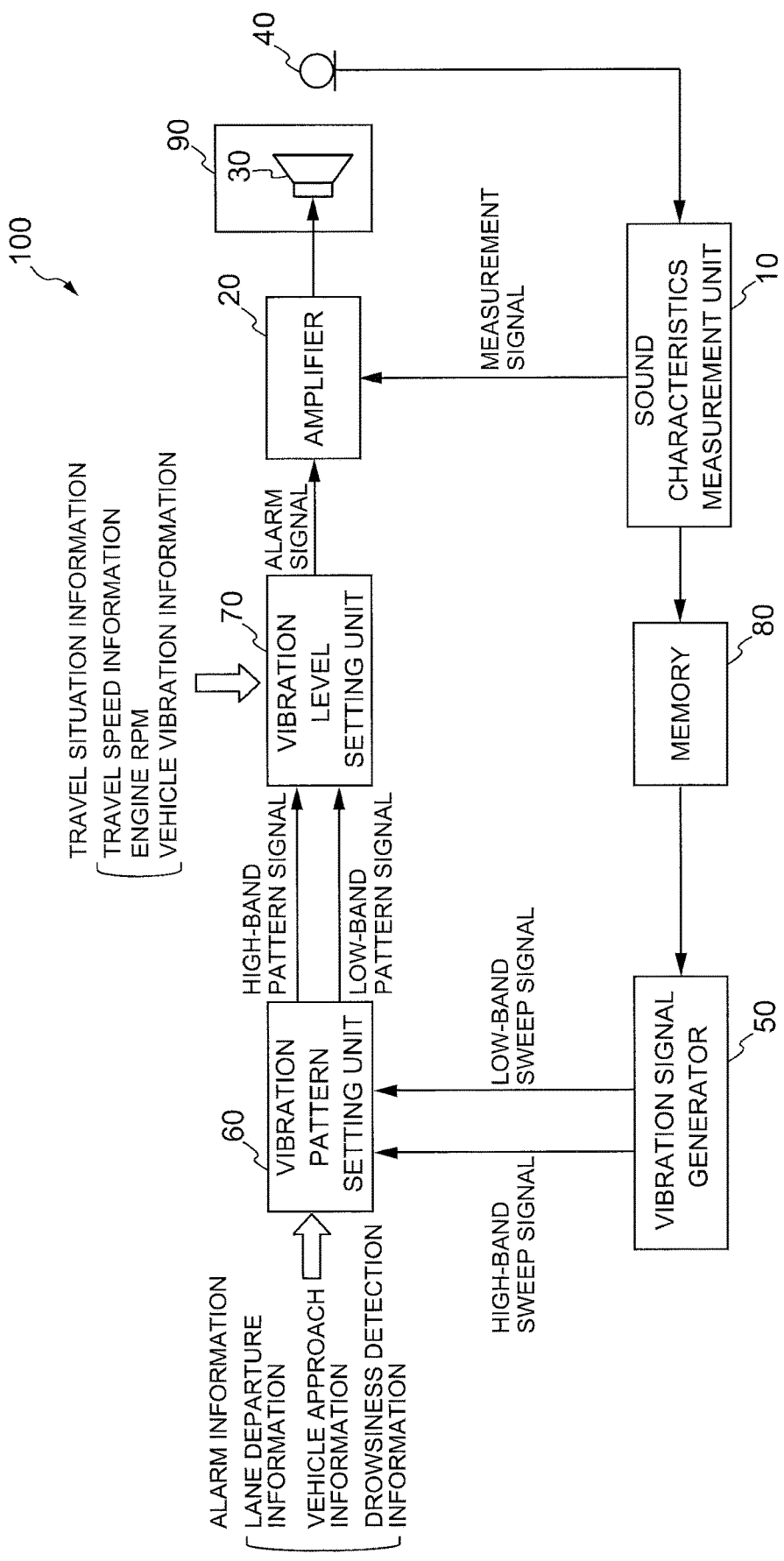
FIG. 1 is a block diagram showing a schematic configuration of a vehicle alarm device according to a first embodiment.

Now, the configurations of first and second embodiments as examples of a vehicle alarm device according to the present invention will be described in detail with reference to the drawings.

First Embodiment

A vehicle alarm device according to the first embodiment alarms the user by transmitting a vibration generated by a vibration generator to the user through a vibration transmission member. The vibration transmission member may be, for example, a vehicle seat or the like. The vibration generator may be a speaker or the like capable of generating a vibration.

Where a speaker is installed in a vehicle seat, a vibration outputted (generated) from the seat inside by the speaker may be significantly attenuated by an internal cushion material or the like before reaching the seat surface. For this reason, even if the level of a signal inputted to the speaker is changed in accordance with the travel speed or the like of the vehicle, disadvantageously, it is not easy to obtain a vibration having desired magnitude on the surface of the vehicle seat.

Vibration characteristics of the vehicle seat greatly vary with the members in the vehicle seat, or the like. For this reason, even if the level of a signal inputted to the speaker is changed in accordance with the travel speed or the like of the vehicle, disadvantageously, the magnitude of a vibration generated on the seat surface varies among vehicle seats having a speaker installed therein.

For example, even if the level of a signal inputted to the speaker to generate a vibration is relatively low, a relatively large vibration may be detected on the surface of one vehicle seat. On the other hand, only a relatively small vibration may be detected on the surface of another vehicle seat. Also, even if the level of a signal inputted to the speaker is relatively high, only a relatively small vibration may be detected on the surface of one vehicle seat. On the other hand, a very large vibration may be detected on the surface of another vehicle seat.

As seen above, when generating an alarm using the speaker installed in the vehicle seat, characteristics of a vibration generated on the seat surface vary with the internal structure or the like of the vehicle seat. For this reason, even if the level of a signal inputted to the speaker is simply changed in accordance with the travel speed or the like of the vehicle, disadvantageously, it is not easy to cause the user to recognize the alarm vibration.

Herein, information that causes an increase or decrease in the magnitude of a travel vibration in the vehicle and whose value varies with the travel situation of the vehicle is defined as travel situation information. Examples of the travel situation information include the value of the travel speed of the vehicle, the value of the engine RPM of the vehicle, and the value of a vibration sensor detected in the vehicle.

The level of a travel vibration varies with the travel state. The level of a travel vibration is high when the frequency is low, and decreases in inverse proportion to increases in the frequency. Also, the entire level of a travel vibration increases when the value of the travel situation information increases, and decreases when the value of the travel situation information decreases.

Figure 10A:
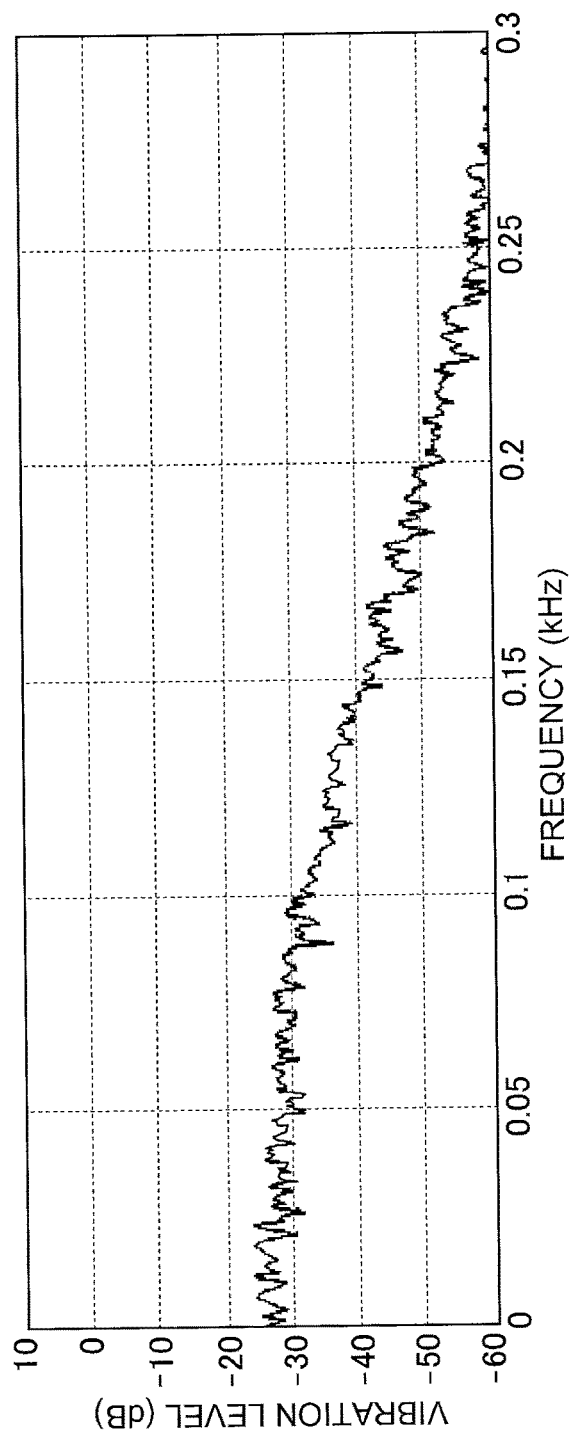
FIG. 10($a$) is a graph showing frequency characteristics of a travel vibration detected on the vehicle seat when the travel speed of the vehicle is 30 km/h, and FIG. 10($b$) is a graph showing frequency characteristics of a travel vibration detected on the vehicle seat when the travel speed of the vehicle is 100 km/h.
Figure 10B:
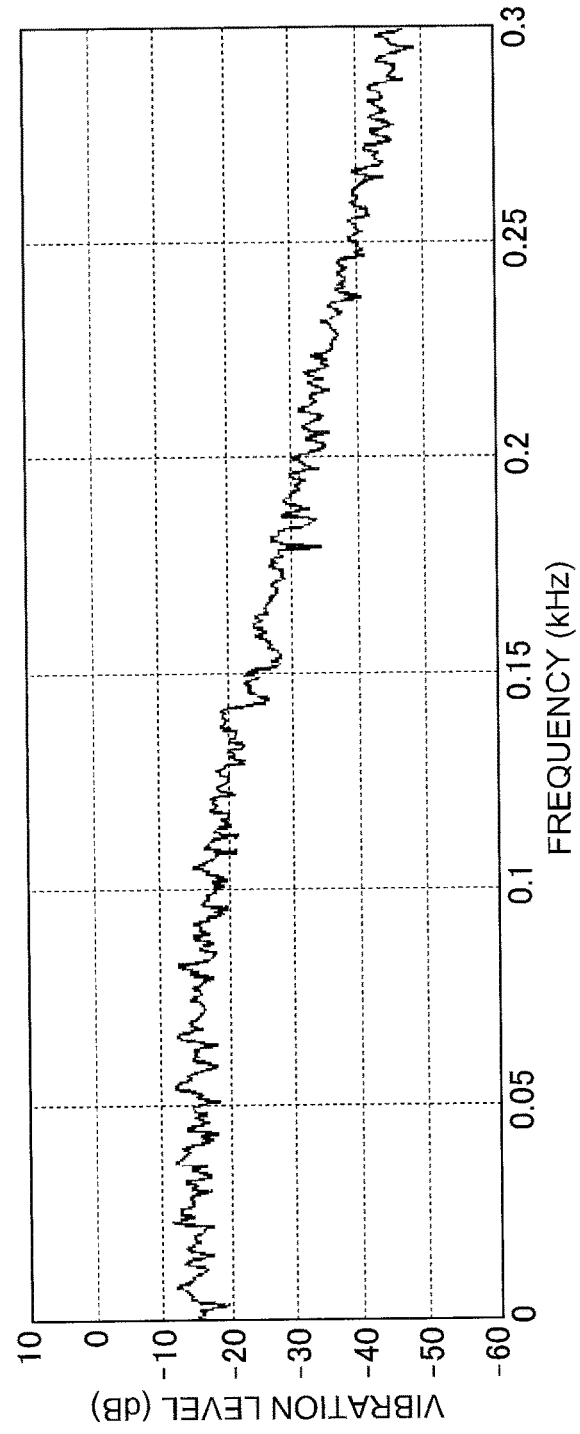

FIG. 10(a) is a graph showing an example of frequency characteristics of a travel vibration detected on the surface of the vehicle seat when the travel speed of the vehicle is 30 km/h. FIG. 10(b) is a graph showing an example of frequency characteristics of a travel vibration detected on the surface of the vehicle seat when the travel speed of the vehicle is 100 km/h. In the frequency characteristics shown in FIGS. 10(a) and 10(b), the level of the travel vibration decreases as the frequency increases and the entire vibration level falls to the right. A comparison between the signal levels having the same frequency in FIG. 10(*a*) and FIG. 10(*b*) reveals that the vibration level when the travel speed is high (FIG. 10(*b*)) tends to be higher than that when the travel speed is low (FIG. 10(*a*)).

As seen above, the vibration characteristics of the travel vibration show that the entire vibration level tends to increase when the travel speed increases. For this reason, even if the level of a signal to be inputted to the speaker is simply changed, disadvantageously, it is not easy to generate a larger alarm vibration than the travel vibration on the vehicle seat. Accordingly, it is necessary to generate an alarm vibration on the vehicle seat or the like in accordance with the travel speed or the like of the vehicle, as well as considering the frequency or the like of the alarm vibration.

A case will be described below in which the vehicle alarm device according to the first embodiment generates an alarm vibration considering vibration characteristics of the vehicle seat and vibration characteristics of a travel vibration.

[Vehicle Alarm Device]

FIG. 1 is a block diagram showing a schematic configuration of the vehicle alarm device according to the first embodiment. A vehicle alarm device 100 includes an sound characteristics measurement unit 10, an amplifier 20, a speaker (vibration generator) 30, a microphone 40, a vibration signal generator (alarm signal generator) 50, a vibration pattern setting unit 60, a vibration level setting unit (travel situation information acquisition unit, alarm signal generator) 70, a memory 80, and a vehicle seat seating portion (vibration transmission member) 90.

[Speaker]

The speaker 30 is a device for generating an alarm vibration. The speaker 30 is preferably a speaker having high low-band sound output performance. Examples of preferable speakers include a dynamic speaker using cone paper or the like and an exciter that generates a vibration on the contact surface. The speaker 30 is installed in the back rest or seating portion of a vehicle seat. The vehicle seat in which the speaker 30 is installed is a seat for a user who has a higher need to be alarmed through an alarm vibration, for example, a seat for the driver. In the first embodiment, a case will be described in which an exciter is installed in the vehicle seat seating portion 90 for the driver as the speaker 30.

[Microphone]

The microphone 40 is installed in a position that is located on the upper surface of the seating portion 90 and in which the seated driver can feel a vibration through a leg portion, such as the thigh. The microphone 40 measures a vibration generated on the upper surface of the seating portion 90 by converting the vibration into a sound. A device other than the microphone 40 may be used as long as the device is able to detect a vibration generated on the upper surface of the seating portion 90. For example, a vibration sensor or the like capable of directly recording a vibration may be used in place of the microphone 40.

[Amplifier]

The amplifier 20 amplifies signals to be inputted to the speaker 30. Specifically, the amplifier 20 receives an alarm signal whose vibration level has been set by the vibration level setting unit 70 and a measurement signal generated by the sound characteristics measurement unit 10, amplifies these signals, and outputs the amplified signals to the speaker 30.

[Sound Characteristics Measurement Unit]

The sound characteristics measurement unit 10 generates a measurement signal by sweeping the center frequency of a sinusoidal wave in a preset frequency range. The level (amplitude) of the measurement signal generated by the sound characteristics measurement unit 10 is amplified by the amplifier 20. The amplified measurement signal is outputted to the speaker 30, which then generates a vibration. The vibration is transmitted from the inside to the upper surface of the seating portion 90, resulting in generation of a vibration on the upper surface of the seating portion 90. The vibration generated on the upper surface of the seating portion 90 is converted into a sound, which is then recorded (measured) by the microphone 40 mounted near the upper surface of the seating portion 90. The sound characteristics measurement unit 10 measures frequency characteristics of the vibration on the seating portion 90 on the basis of the vibration sound recorded (measured) by the microphone 40.

Figure 2:
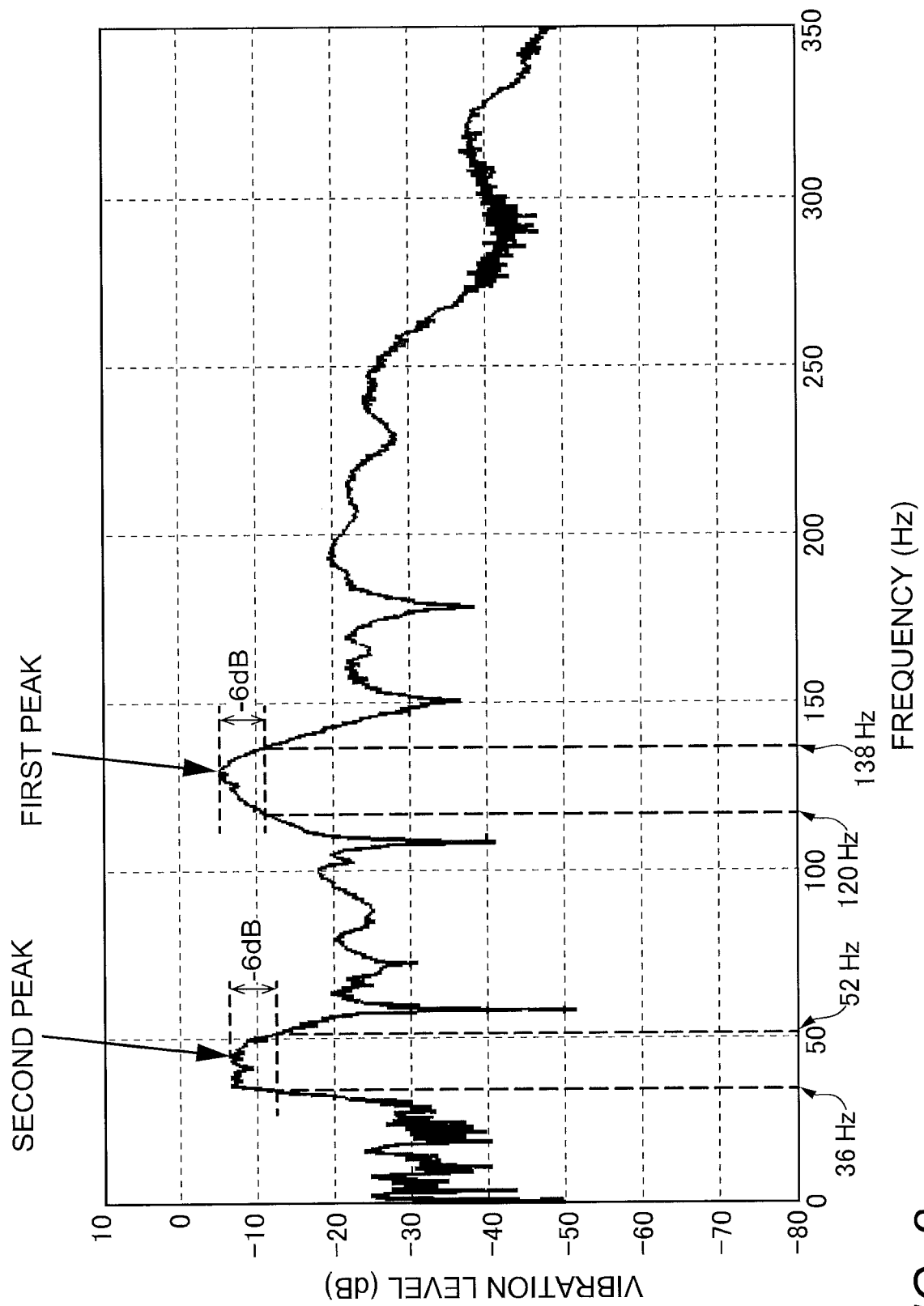
FIG. 2 is a graph showing frequency characteristics of a vibration measured by a microphone in a case in which the sweep frequency range of a measurement signal according to the first embodiment is set to 0 to 350 Hz.

FIG. 2 is a graph showing frequency characteristics of a vibration measured by the microphone 40 in a case in which the frequency range of a measurement signal to be swept is set to 0 to 350 Hz. Note that a vibration is measured as a sound by the microphone 40 and therefore the magnitude (level) of the measured vibration sound corresponds to the "signal level." However, the microphone 40 substantially measures a vibration. For this reason, the explanation will be provided while referring to the signal level as the "vibration level" for convenience. That is, the level of the sound measured by the microphone 40 substantially means the level of the vibration.

As shown in FIG. 2, the frequency characteristics of the measured vibration show that the vibration levels around two frequencies, 40 Hz and 130 Hz, are higher values than those at the other frequencies. The two frequencies correspond to resonant frequencies. The vibration levels at frequencies other than the resonant frequencies are lower values than those at the resonant frequencies by 10 dB or more.

The sound characteristics measurement unit 10 determines two or more peaks based on the resonant frequencies and the predetermined frequency ranges of the peaks from the frequency characteristics of the measured vibration. Specifically, the sound characteristics measurement unit 10 detects the maximum value of the vibration level on the basis of the frequency characteristics of the measured vibration. Hereinafter, a frequency indicating the maximum value refers as a first peak. In the frequency characteristics shown in FIG. 2, 130 Hz corresponds to the frequency indicating the maximum value (first peak). The sound characteristics measurement unit 10 sets, as a threshold, −6 dB from the vibration level indicating the maximum value and detects a frequency range corresponding to the threshold of −6 dB. In the frequency characteristics shown in FIG. 2, a frequency range of 120 to 138 Hz corresponds to the threshold of −6 dB.

As described above, the vibration levels at frequencies other than the resonant frequencies indicate lower values than the vibration levels at the resonant frequencies by 10 dB or more. For this reason, the vibration levels in the frequency range corresponding to −6 dB from the vibration level at 130 Hz, which is the maximum value, also indicate remarkably higher values than the vibration levels at the other frequencies. That is, the vibration levels in the frequency range of 120 to 138 Hz corresponding to the vibration levels within −6 dB set as the threshold are remarkably higher values than the vibration levels at the other frequencies.

The sound characteristics measurement unit 10 then obtains a frequency (second peak) indicating the maximum vibration level of the other frequencies except for the frequency range of 120 to 138 Hz. In the frequency range shown in FIG. 2, 40 Hz corresponds to the frequency indicating the maximum value (second peak). The sound characteristics measurement unit 10 then sets, as a threshold, −6 dB from the vibration level at 40 Hz and detects a frequency range corresponding to the threshold of −6 dB. In the frequency characteristics shown in FIG. 2, a frequency range of 36 to 52 Hz corresponds to the threshold of −6 dB. The vibration levels in the frequency range of 36 to 52 Hz are also remarkably higher values than the vibration levels at the other frequencies.

The sound characteristics measurement unit 10 stores the lower-limit frequency of 120 Hz and the upper-limit frequency of 138 Hz of the frequency range including the above first peak in the memory 80 as lower-limit value information and upper-limit value information of the high-band resonant frequency range. The sound characteristics measurement unit 10 also stores the lower-limit frequency of 36 Hz and the upper-limit frequency of 52 Hz of the frequency range including the above second peak in the memory 80 as lower-limit value information and upper-limit value information of the low-band resonant frequency range.

[Memory]

The memory 80 consists of typical data storage means. The memory 80 may have any configuration or may be of any type as long as it is storage means in and from which data can be stored and read, such as a typical hard disk, solid state drive (SSD), or non-volatile memory. The memory 80 stores the lower-limit value information and upper-limit value information of the low-band resonant frequency range and the lower-limit value information and upper-limit value information of the high-band resonant frequency range obtained by the sound characteristics measurement unit 10.

[Vibration Signal Generator]

The vibration signal generator 50 reads and obtains the lower-limit value information and upper-limit value information of the low-band resonant frequency range and the lower-limit value information and upper-limit value information of the high-band resonant frequency range from the memory 80. Herein, a signal obtained by sweeping the frequency from the value of the lower-limit value information to the value of the upper-limit value information of the resonant frequency range sequentially once is defined as a sweep signal corresponding to one cycle. The vibration signal generator 50 generates a high-band sweep signal corresponding to one cycle on the basis of the obtained lower-limit value information and upper-limit value information of the high-band resonant frequency range. The vibration signal generator 50 also generates a low-band sweep signal corresponding to one cycle on the basis of the obtained lower-limit value information and upper-limit value information of the low-band resonant frequency range. The low-band sweep signal and high-band sweep signal are signals serving as the basis of an alarm signal for generating a vibration on the seating portion 90. The vibration signal generator 50 according to the first embodiment generates two types of sweep signals, a high-band sweep signal and a low-band sweep signal.

Since the two resonant frequencies have been detected in the frequency characteristics of the vibration measured by the sound characteristics measurement unit 10, the vibration signal generator 50 according to the first embodiment is configured to generate two types of sweep signals. However, if three or more resonant frequencies are detected by the sound characteristics measurement unit 10, the vibration signal generator 50 may be configured to generate three or more types of sweep signals. The vibration signal generator 50 only has to be able to generate at least two or more types of sweep signals. If three or more resonant frequencies are detected, the vibration signal generator 50 may be configured to select any two of those resonant frequencies and to generate two types of sweep signals.

While, in the first embodiment, the vibration signal generator 50 generates sweep signals as signals serving as the basis of an alarm signal, the signals serving as the basis of an alarm signal are not necessarily limited to sweep signals and only have to be signals including at least any frequencies in the above frequency range (the frequency range between the upper-limit value and lower-limit value inclusive).

For example, a sinusoidal wave including any frequency included in the frequency range of 36 to 52 Hz (e.g., 40 Hz having the maximum vibration level in this frequency range) may be used as a low-band signal serving as the basis of an alarm signal, and a sinusoidal wave including any frequency included in the frequency range of 120 to 138 Hz (e.g., 130 Hz having the maximum vibration level in this frequency range) may be used as a high-band signal serving as the basis of an alarm signal.

By using the sinusoidal waves including the resonant frequencies of the vehicle seat as signals serving as the basis of an alarm signal, it is possible to generate an effective vibration suitable for the vibration characteristics of the vehicle seat.

Figure 3A:
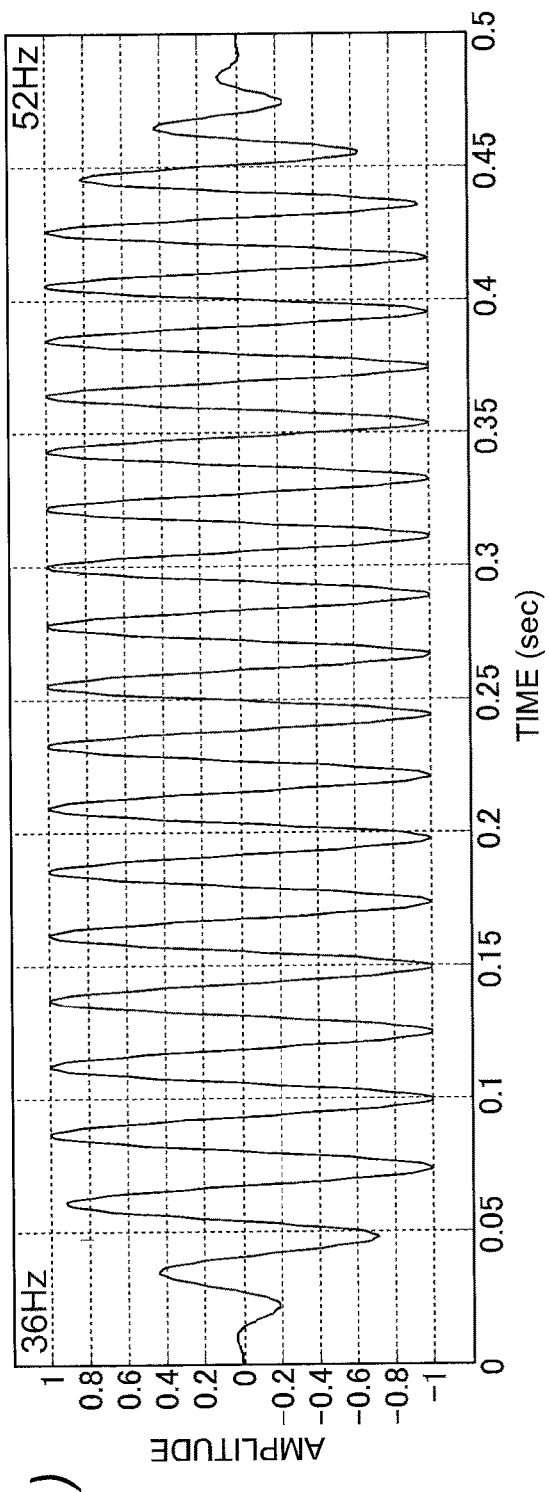
FIG. 3($a$) is a graph showing amplitude characteristics of a low-band sweep signal according to the first embodiment, and FIG. 3($b$) is a graph showing amplitude characteristics of a high-band sweep signal according to the first embodiment.
Figure 3B:
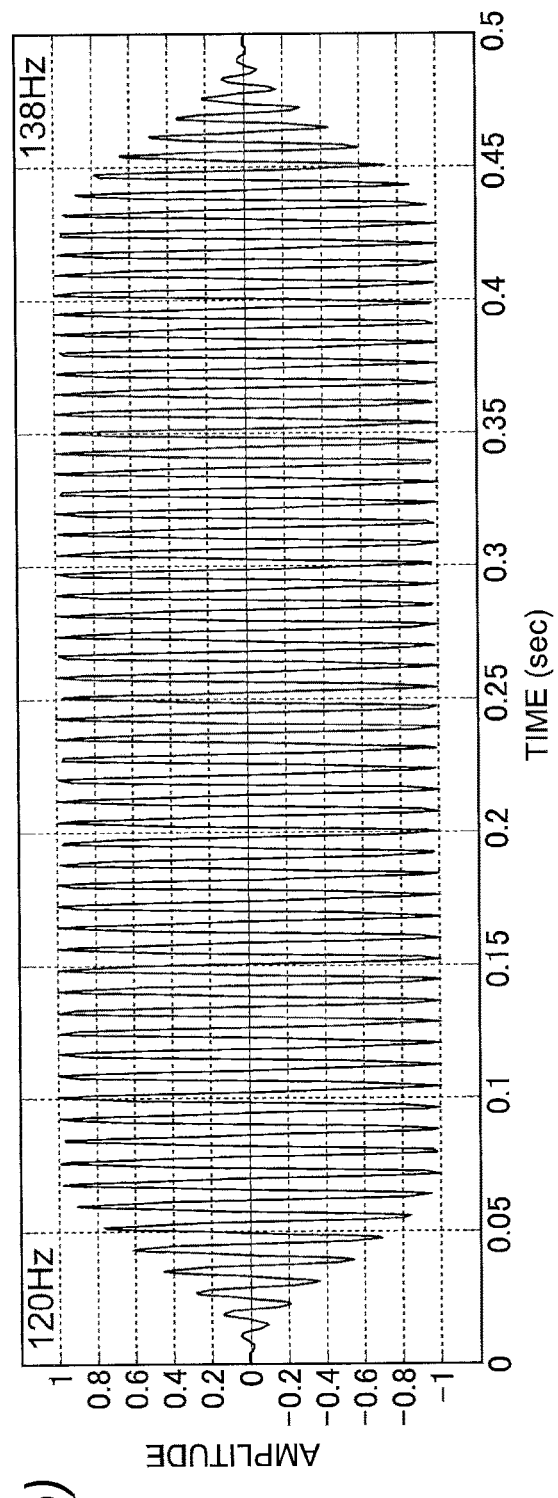
Figure 4A:
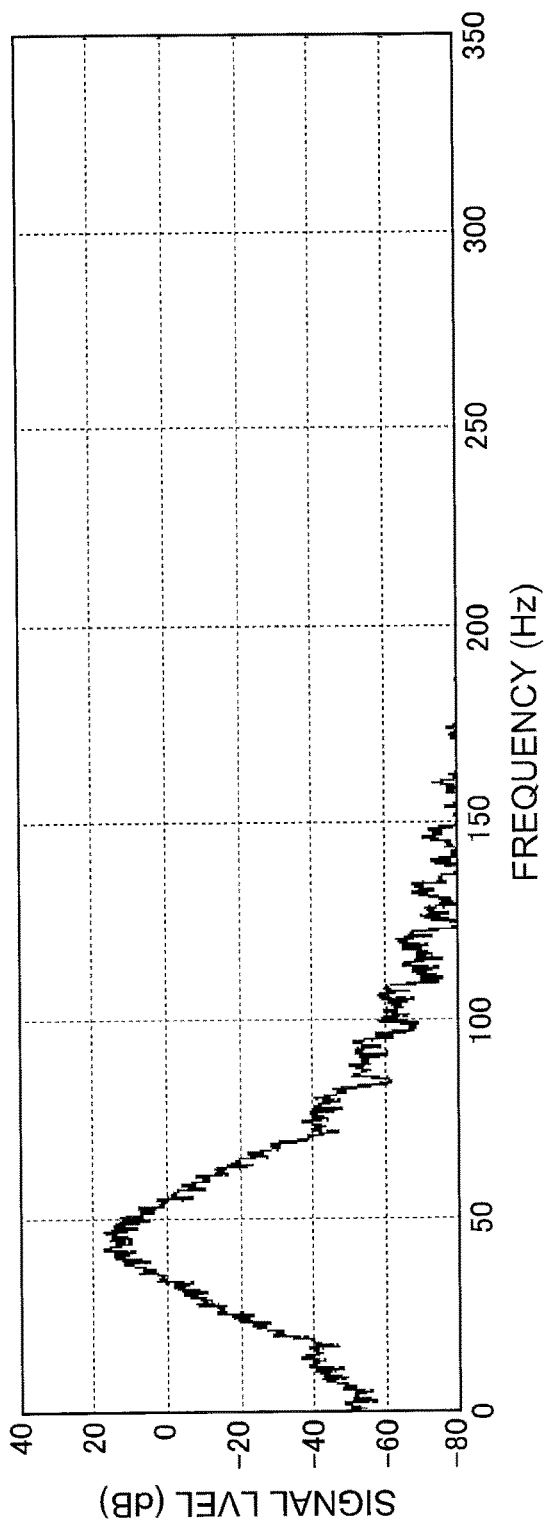
FIG. 4($a$) is a graph showing frequency characteristics of a low-band sweep signal according to the first embodiment, and FIG. 4($b$) is a graph showing frequency characteristics of a high-band sweep signal according to the first embodiment.
Figure 4B:
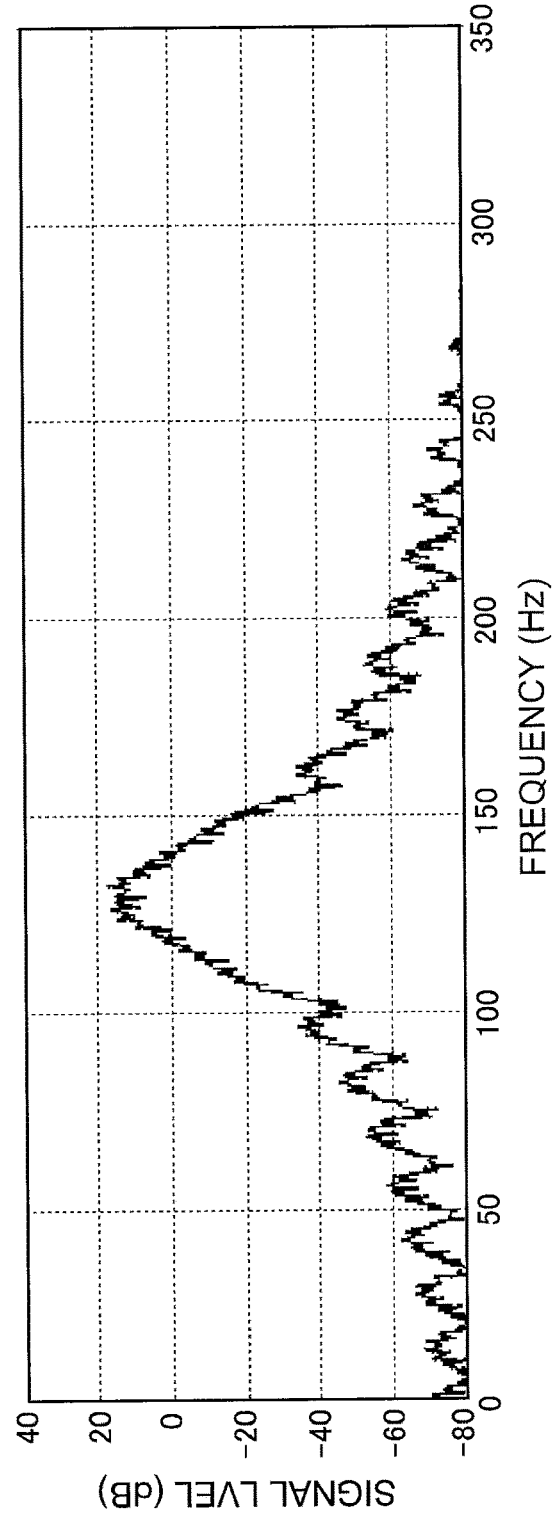

FIG. 3(*a*) shows amplitude characteristics of the low-band sweep signal. FIG. 4(*a*) shows frequency characteristics of the low-band sweep signal. FIG. 3(*b*) shows amplitude characteristics of the high-band sweep signal. FIG. 4(*b*) shows frequency characteristics of the high-band sweep signal. As shown in FIGS. 3(*a*) and 4(*a*), the low-band sweep signal is a signal having a lower-limit frequency of 36 Hz, an upper-limit frequency of 52 Hz, and a one-cycle time of 0.5 sec. As shown in FIGS. 3(*b*) and 4(*b*), the high-band sweep signal is a signal having a lower-limit frequency of 120 Hz, an upper-limit frequency of 138 Hz, and a one-cycle time of 0.5 sec. The vibration signal generator 50 outputs the generated two types of sweep signals (low-band sweep signal and high-band sweep signal) to the vibration pattern setting unit 60.

[Vibration Pattern Setting Unit]

The vibration pattern setting unit 60 generates pattern signals by changing the vibration pattern of the two types of sweep signals received from the vibration signal generator 50 in accordance with alarm details. An alarm device (not shown) is connected to the vibration pattern setting unit 60. The alarm device is, for example, an electronic control unit or the like for danger information detection mounted on the vehicle. For example, the alarm device detects whether the traveling vehicle has departed from the lane, whether the own vehicle is quickly approaching another vehicle traveling in front, and whether the driver is in a drowsy state or other states. The alarm device determines the respective states from the detection results and outputs alarm information, such as lane departure information, vehicle approach information, and drowsiness detection information, to the vibration pattern setting unit 60.

The vibration pattern setting unit 60 generates different pattern signals in accordance with details of the alarm information received from the alarm device. FIGS. 5(*a*) and 5(*b*) are graphs showing examples of pattern signals generated on the basis of vehicle departure information. FIG. 5(*a*) is a graph showing amplitude characteristics of a low-band pattern signal generated on the basis of the low-band sweep signal. FIG. 5(*b*) is a graph showing amplitude characteristics of a high-band pattern signal generated on the basis of the high-band sweep signal. The amplitude characteristics shown in FIGS. 5(*a*) and 5(*b*) show that the pattern signals have been outputted continuously in two cycles as sweep signals having a one-cycle time of 0.5 sec and then have continued for 0.5 sec as signals having amplitude of zero. Accordingly, the time of one pattern of the generated pattern signals is 1.5 sec. The vibration pattern setting unit 60 continuously outputs the low-band pattern signal shown in FIG. 5(*a*) and the high-band pattern signal shown in FIG. 5(*b*) to the vibration level setting unit 70 while receiving the lane departure information from the alarm device.

[Vibration Level Setting Unit]

The vibration level setting unit 70 adjust the levels of the high-band pattern signal and low-band pattern signal received from the vibration pattern setting unit 60 by weighting the respective signal levels. The vibration level setting unit 70 then generates an alarm signal by combining the weighted high-band pattern signal and low-band pattern signal.

A travel situation detector (not shown) is connected to the vibration level setting unit 70. The travel situation detector is, for example, an electronic control unit or the like that is mounted on the vehicle and detects the vehicle speed, the engine RPM, the amount of vibration in the vehicle, or the like. For example, the travel situation detector detects the travel speed of the vehicle as travel speed information, or detects the engine RPM as engine RPM information, or detects the magnitude of a vibration as vehicle vibration information using a vibration sensor mounted on the vehicle body under the seat. The travel situation detector outputs the detected information as travel situation information to the vibration level setting unit 70.

The travel speed information, engine RPM information, or vehicle vibration information corresponding to the travel situation information corresponds to information that causes an increase or decrease in the travel vibration in the vehicle. Also, the travel situation information corresponds to information whose value varies with the travel situation of the vehicle.

The vibration level setting unit 70 adjusts the amount of weighting on the basis of the travel situation information received form the travel situation detector. In the first embodiment, a case will be described in which the travel speed information is received as travel situation information. FIG. 6(*a*) is a graph showing the correspondence between the travel speed of the vehicle detected on the basis of the travel speed information and the amount of weighting with respect to the high-band pattern signal and low-band pattern signal. Note that if the engine RPM information is used as travel situation information, information of the horizontal axis shown in FIG. 6(*a*) is the engine RPM; if the vehicle vibration information is used as travel situation information, information of the horizontal axis shown in FIG. 6(*a*) is the vibration level detected by the vibration sensor.

As shown in FIG. 6(*a*), the vibration level setting unit 70 reduces the amount of weighting of the low-band pattern signal from 1.0 to 0 as the travel speed increases. On the other hand, the vibration level setting unit 70 increases the amount of weighting of the high-band pattern signal from 0 to 1.0 as the travel speed increases. By adjusting the amount of weighting in this manner, the vibration level setting unit 70 adjusts the ratio of the level of the high-band pattern signal (high-band alarm signal) to the level of the low-band pattern signal (low-band alarm signal). When the travel speed of the vehicle is low, the level of the low-band pattern signal has a high ratio and is dominant and, on the other hand, the level of the high-band pattern signal is suppressed. When the travel speed of the vehicle is high, the level of the high-band pattern signal has a high ratio and is dominant and, on the other hand, the level of the low-band pattern signal is suppressed. The vibration level setting unit 70 generates an alarm signal by weighting the high-band pattern signal and the low-band pattern signal using the amounts of weighting of the pattern signals determined on the basis of the travel speed and then combining the weighted pattern signals.

The generated alarm signal is amplified by the amplifier 20 and then outputted to the speaker 30. The speaker 30 generates an alarm vibration on the upper surface of the seating portion 90 on the basis of the received alarm signal.

If the engine RPM information or vehicle vibration information is used as travel situation information, the amount of weighting of the low-band pattern signal is reduced as the engine RPM or the vibration level in the vehicle increases, and the amount of weighting of the high-band pattern signal is increased as the engine RPM or the vibration level in the vehicle increases, as in FIG. 6(*a*).

FIG. 6(*b*) shows amplitude characteristics of the pattern of an alarm vibration generated when the vehicle has departed from the lane while traveling at 30 km/h. Specifically, FIG. 6(*b*) shows amplitude characteristics of the pattern of an alarm vibration obtained by weighting the low-band pattern signal shown in FIG. 5(*a*) and the high-band pattern signal shown in FIG. 5(*b*) on the basis of the amounts of weighting corresponding to 30 km/h shown in FIG. 6(*a*) and then combining the weighted pattern signals.

FIGS. 7(*a*) and 7(*b*) are graphs showing frequency characteristics of vibrations generated on the vehicle seat during travel of the vehicle. Specifically, FIG. 7(*a*) shows frequency characteristics of a vibration generated when an alarm signal generated on the basis of the amounts of weighting shown in FIG. 6(*a*) is outputted from the speaker 30 when the travel speed of the vehicle is 30 km/h. FIG. 7(*b*) shows frequency characteristics of a vibration generated when an alarm signal generated on the basis of the amounts of weighting shown in FIG. 6(*a*) is outputted from the speaker 30 when the travel speed of the vehicle is 100 km/h.

The frequency characteristics of the vibration shown in FIG. 7(*a*) show that the vibration levels in the frequency range of the low-band pattern signal (corresponding to the sweep frequency range of the low-band sweep signal) are remarkably high. Also, the frequency characteristics of the vibration shown in FIGS. 7(*a*) and 7(*b*) show that the vibration levels in the frequency range of the high-band pattern signal (corresponding to the sweep frequency range of the high-band sweep signal) are remarkably high. The levels of travel vibrations transmitted from the vehicle body to the vehicle seat due to the travel or the like of the vehicle are shown at the other frequencies (frequencies other than the sweep frequencies of the low-band sweep signal and high-band sweep signal).

As shown in FIGS. 10(*a*) and 10(*b*), the levels at low-band frequencies of the travel vibrations tend to be higher than those at high-band frequencies. Also, the entire level of the travel vibration generated when the travel speed of the vehicle is high tends to be higher than the level of the travel vibration generated when the travel speed is low. Further, the entire level of the travel vibration tends to increase as the travel speed increases.

As shown in the frequency characteristics in FIG. 7(*a*), when the vehicle is traveling at low speed (30 km/h), the entire level of the travel vibration is low. Also, the frequency range of the low-band pattern signal includes the low-band resonant frequency and therefore an alarm vibration having sufficient magnitude corresponding to the vibration characteristics of the seat can be generated in a low frequency band. For these reasons, by setting the amount of weighting of the low-band pattern signal to a value close to equal magnification (a value close to 1.0; see FIG. 6(a)), a sufficient difference can be ensured between the vibration level in the low frequency band of the travel vibration and the vibration level in the frequency range of the low-band pattern signal (the sweep frequency range of the low-band sweep signal). Thus, even if the amount of weighting of the high-band pattern signal is small (about 0.2 (see FIG. 6(a)), the seated person is able to feel the low-band vibration based on the low-band pattern signal from the vehicle seat and to recognize occurrence of an alarm through the vibration.

On the other hand, as shown in the frequency characteristics in FIG. 7(b), when the vehicle is traveling at high speed (100 hm/h), the entire level of the travel vibration is high. In particular, the vibration levels at high-band frequencies of the travel vibration tend to be higher than those at low-band frequencies. For these reasons, even if the amount of weighting of the low-band pattern signal is set to a large value, it is difficult to ensure a sufficient difference between the vibration level in the low frequency band of the travel vibration and the vibration level in the frequency range of the low-band pattern signal (the sweep frequency range of the low-band sweep signal).

The levels at high-band frequencies of the travel vibration tend to be lower than those at low-band frequencies. Also, the frequency range of the high-band pattern signal (the sweep frequency range of the high-band sweep signal) includes the high-band resonant frequency and therefore a vibration having sufficient magnitude corresponding to vibration characteristics of the vehicle seat can be generated on the basis of the high-band pattern signal. For these reasons, by setting the amount of weighting of the high-band pattern signal rather than the amount of weighting of the low-band pattern signal to a value close to equal magnification (a value close to 1.0; see FIG. 6(a)), a sufficient difference can be ensured between the vibration level in the frequency range of the high-band pattern signal (the sweep frequency range of the high-band sweep signal) and the vibration level in the high frequency band of the travel vibration. By reducing the amount of weighting of the low-band pattern signal and increasing the amount of weighting of the high-band pattern signal in this manner, the seated person is able to feel the vibration based on the high-band pattern signal from the vehicle seat and to recognize occurrence of an alarm through the vibration.

Figure 6A:
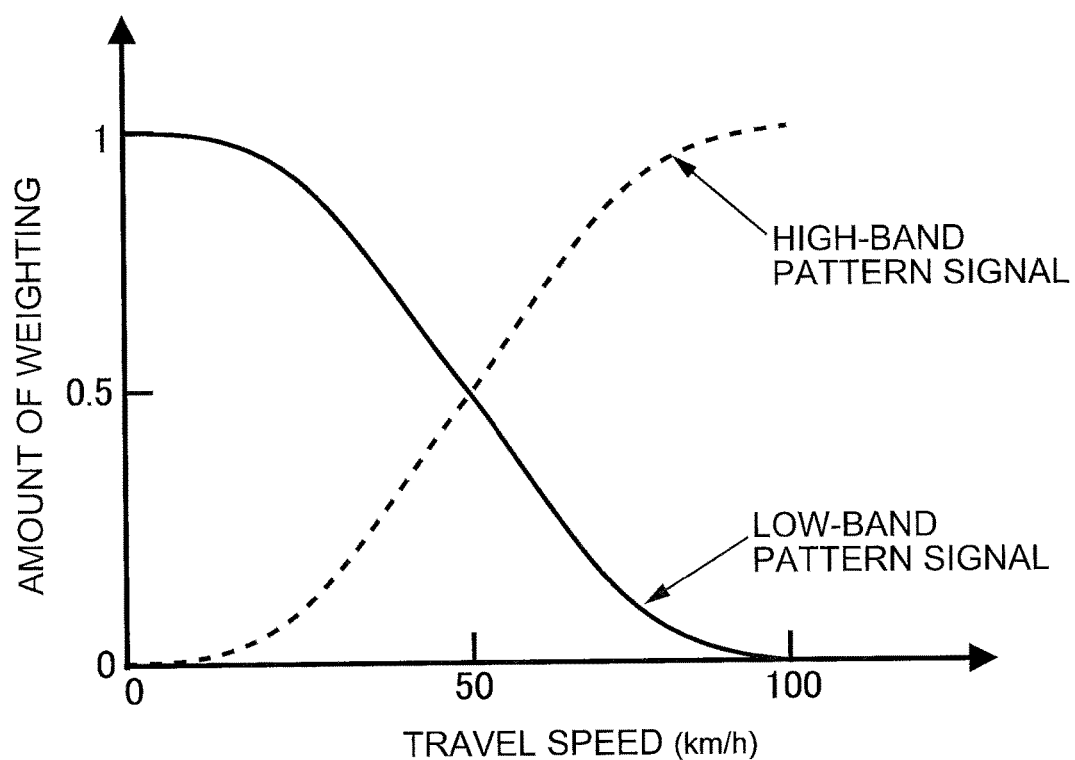
FIG. 6($a$) is a graph showing the correspondence between the travel speed of the vehicle and the amount of weighting with respect to a high-band pattern signal and a low-band pattern signal, and FIG. 6($b$) is a graph showing amplitude characteristics of a vibration pattern when the vehicle has departed from the lane while traveling at 30 km/h.
Figure 6B:
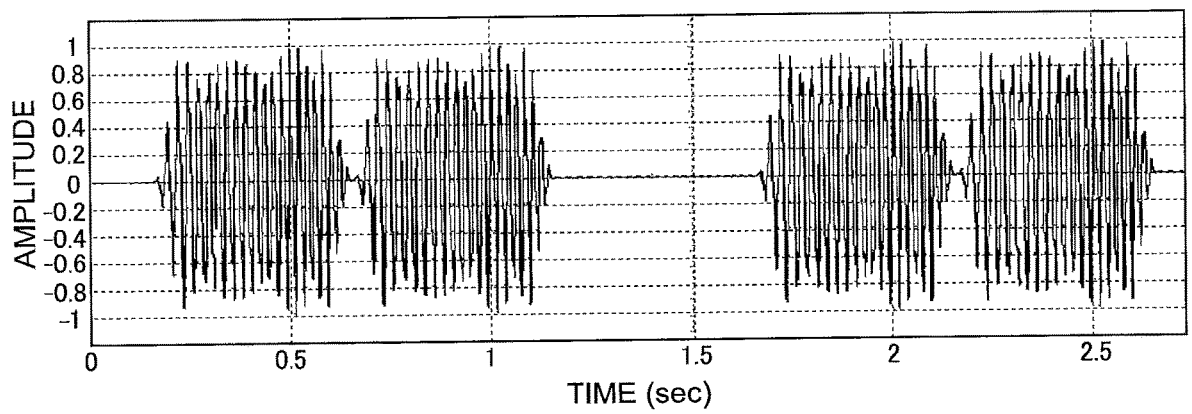
Figure 8:
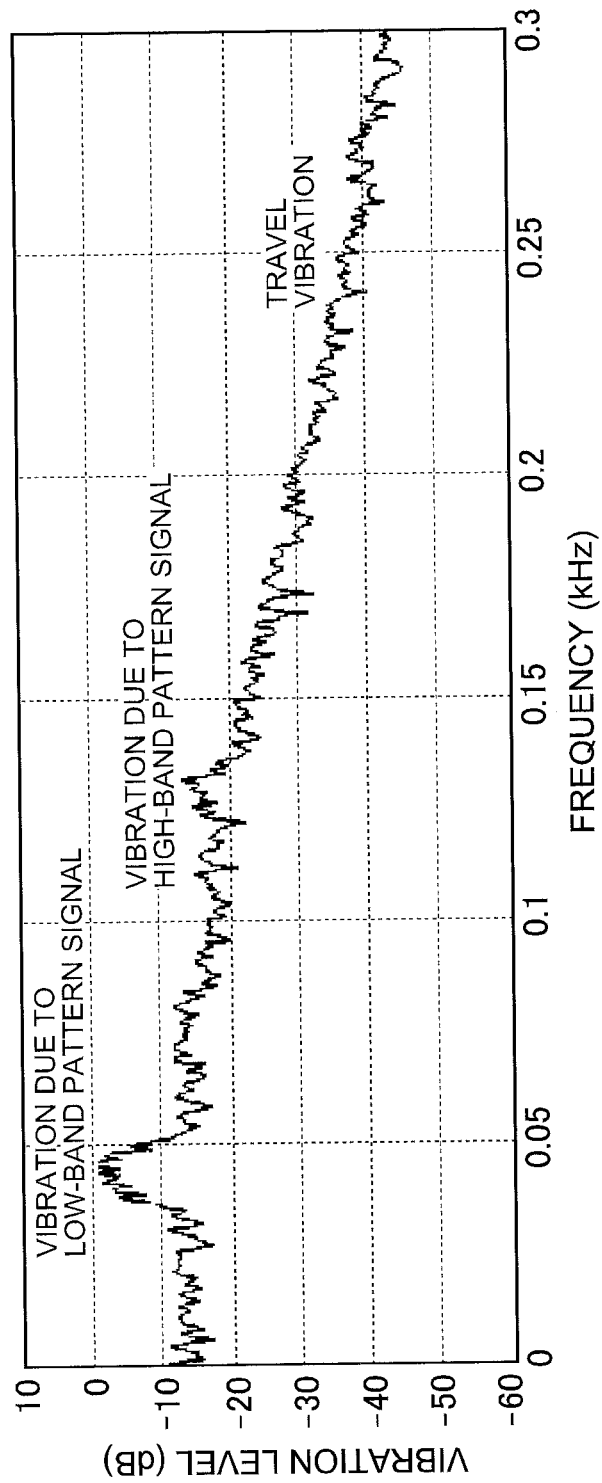
FIG. 8 is a graph showing frequency characteristics of a vibration generated on the vehicle seat on the basis of an alarm signal generated using the amount of weighting corresponding to 30 km/h when the vehicle speed is 100 km/h.

FIG. 8 shows frequency characteristics of an alarm vibration generated by obtaining the amount of weighting corresponding to a travel speed of 30 km/h on the basis of the correspondence between the travel speed of the vehicle and the amount of weighting shown in FIG. 6(a) to generate an alarm signal and outputting the generated alarm signal from the speaker 30 when the travel speed is 100 km/h. With respect to the alarm signal generated on the basis of the amount of weighting corresponding to 30 km/h, as described above, the amount of weighting of the low-band pattern signal is set to a value close to equal magnification (a value close to 1.0; see FIG. 6(a)), and the amount of weighting of the high-band pattern signal is set to a small value (about 0.2; see FIG. 6(a)). However, the travel vibration in the case of 100 km/h shows relatively high levels in both a low band and a high band. For this reason, even if the amount of weighting of the low-band pattern signal is set to a value close to equal magnification, the vibration generated on the basis of the low-band pattern signal would be embedded in the travel vibration and masked. In this state, it is difficult to ensure a sufficient difference between the vibration level in the low frequency band of the travel vibration and the vibration level in the frequency range of the low-band pattern signal (the sweep frequency range of the low-band sweep signal), and it is not easy for the seated person to recognize the vibration based on the alarm signal (alarm vibration).

For this reason, when the travel speed of the vehicle is high (e.g., 100 km/h), the amount of weighting of the high-band pattern signal is made larger than the amount of weighting of the low-band pattern signal. Thus, as shown in FIG. 7(b), the difference between the vibration level in the frequency range of the high-band pattern signal (the sweep frequency range of the high-band sweep signal) and the vibration level in the high frequency band of the travel vibration can be increased, and the user can be caused to easily recognize the vibration based on the alarm signal (alarm vibration).

Travel noise also occurs during travel of the vehicle. As with a travel vibration, the volume of travel noise increases as the travel speed of the vehicle increases. Also, when the speaker 30 installed in the seating portion 90 of the vehicle seat generates a vibration, the vehicle seat vibrates and thus a sound may occur at a high-band frequency. With respect to auditory characteristics, the sensitivity increases as the frequency increases and therefore a vibration is more likely to be recognized as a sound as the vibration frequency increases.

For these reasons, when the travel speed of the vehicle is low, an alarm vibration using, as a main component, components of the low-band pattern signal including the low-band resonant frequency is generated on the vehicle seat. This can make it difficult for the seated person to recognize the alarm vibration as a sound. On the other hand, when the travel speed of the vehicle is high, an alarm vibration using, as a main component, the high-band pattern signal including the high-band resonant frequency is generated on the vehicle seat. Thus, the components of the alarm vibration that are converted into a sound can be masked by travel noise. Thus, for example, if part of the alarm vibration based on the high-band pattern signal is outputted as a sound from the speaker 30 installed in the seating portion 90, the sound of the alarm vibration would be masked by travel noise. This can make it difficult for an occupant other than the person seated on the driver's seat to recognize the alarm sound. As a result, only the person seated on the driver's seat can be caused to recognize the alarm.

As described above, by generating an alarm signal using the resonant frequencies, an effective alarm vibration can be generated considering vibration characteristics or sound characteristics, which vary among vehicle seats.

Also, by changing the amount of weighting in accordance with the travel speed of the vehicle, the engine RPM, the value detected by the vibration sensor in the vehicle, or the like, it is possible to adjust the ratio of the level of the high-band components to the level of the low-band components of the alarm signal. This allows for generation of an alarm vibration that ensures a sufficient level difference with respect to the travel vibration and thus for an increase in the distinguishability of the alarm vibration.

Also, the level of the low-band components of the alarm signal or the level of the high-band components thereof is selectively used in accordance with the level of the travel vibration. The level of the alarm vibration can be prevented from being masked by the travel vibration. Also, the sound of the alarm vibration that can be generated in a high band is masked by travel noise. This can make it difficult for an occupant other than the person seated on the driver's seat to become aware of the sound of the alarm vibration.

While the vehicle alarm device according to one embodiment of the present invention has been described in detail using the drawings and the vehicle alarm device 100 as an example, the vehicle alarm device according to the present invention is not limited to the example described in the first embodiment.

In the first embodiment, the case has been described in which the two resonant frequencies are detected and an alarm signal in the frequency range including the resonant frequencies is generated using the two types of sweep signals, the high-band sweep signal and the low-band sweep signal. However, the number of types of sweep signals is not limited to two. If three or more resonant frequencies are detected, multiple types of sweep signals may be generated by dividing the frequency range into multiple ranges. For example, an alarm vibration may be generated by detecting three resonant frequencies, generating a low-band sweep signal, a medium-band sweep signal, and a high-band sweep signal with respect to respective frequency ranges including the resonant frequencies, and changing the amounts of weighting of the sweep signals in accordance with the travel speed or selecting a sweep signal to be used.

Figure 9A:
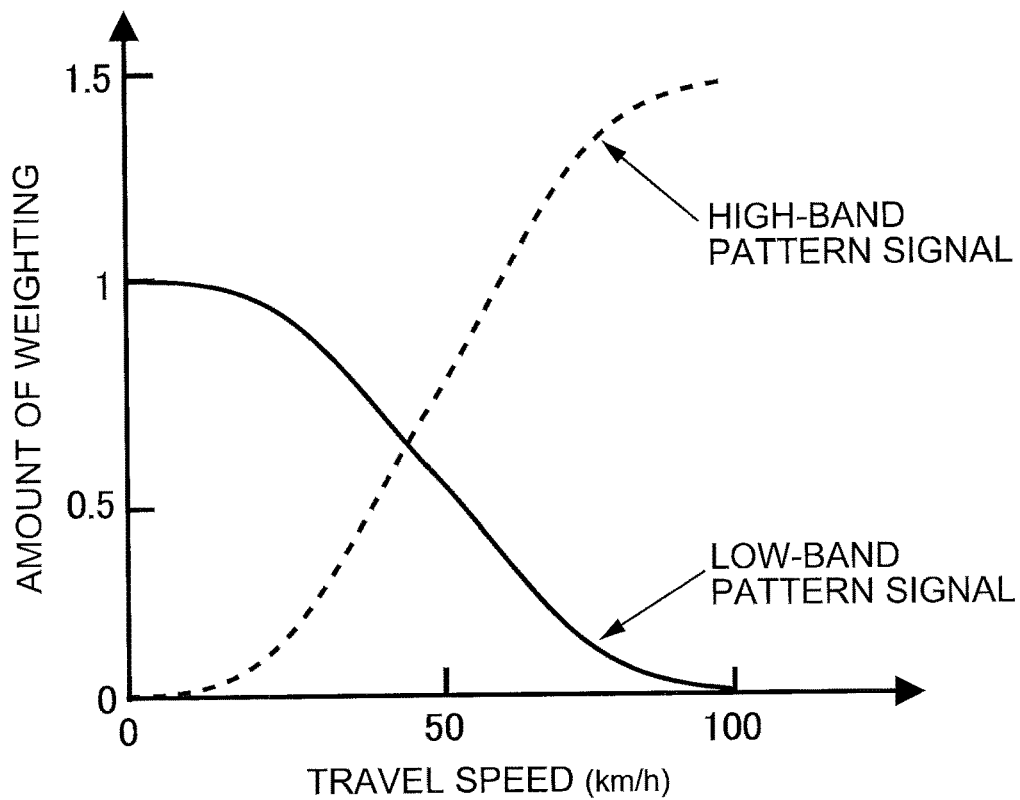
FIGS. 9($a$) and 9($b$) are graphs showing another example of the correspondence between the travel speed of the vehicle and the amount of weighting with respect to a high-band pattern signal and a low-band pattern signal.
Figure 9B:
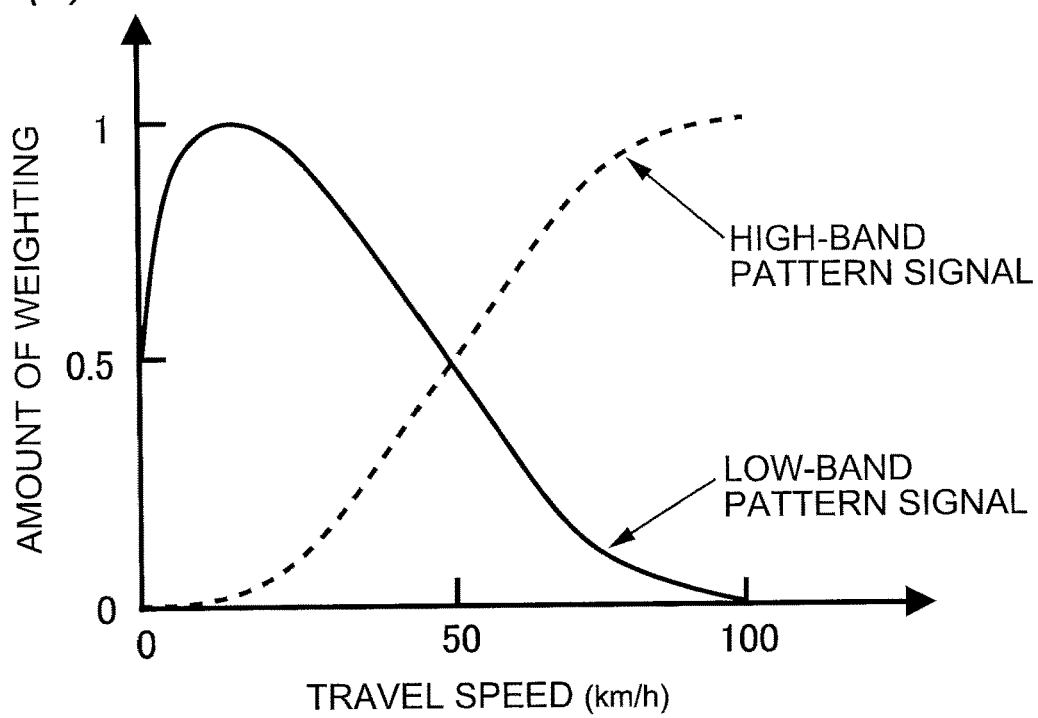

Preferably, the amount of weighting determined in accordance with the travel speed is set in accordance with the level of a vibration generated at the resonant frequency. For example, if the vibration level at the low-band resonant frequency is lower than the vibration level at the high-band resonant frequency, the rate of increase of the amount of weighting of the high-band pattern signal may be increased, as shown in FIG. 9(*a*). Thus, when the travel speed of the vehicle increases and the level of the vibration generated on the basis of the high-band pattern signal becomes dominant compared to the level of the vibration generated on the basis of the low-band pattern signal, a decrease in the entire level of the alarm vibration can be suppressed. Also, when the travel speed of the vehicle increases and thus the travel vibration increases, the level in the sweep frequency range of the high-band sweep signal can be increased and masking of the level of the alarm vibration by the travel vibration can be reduced.

Also, if a vibration generated on the vehicle seat on the basis of the low-band pattern signal during stop or low-speed travel of the vehicle is strong in terms of feeling, the amount of weighting of the low-band pattern signal during stop or low-speed travel may be reduced to about 0.5, as shown in FIG. 9(*b*). Thus, the vibration from the speaker 30 felt during stop or low-speed travel is reduced. This can prevent the alarm vibration from being excessively increased in terms of feeling.

The level of the travel vibration is low during stop or low-speed travel and therefore the level of the alarm vibration is less likely to be masked by the travel vibration. However, the sensitivity for recognizing an alarm vibration varies among users, and there are also user preferences or the like. For these reasons, multiple amounts of weighting may be previously prepared as setting items so that the user can select among the amounts of weighting.

The amount of weighting of the high-band pattern signal and the amount of weighting of the low-band pattern signal may be set or changed separately. For example, if the travel speed of the vehicle increases and thus the travel vibration increases, there may be performed one or both of a process of reducing the amount of weighting of the low-band pattern signal and a process of increasing the amount of weighting of the high-band pattern signal. Also, for example, if the travel speed of the vehicle decreases and thus the travel vibration decreases, there may be performed one or both of a process of increasing the amount of weighting of the low-band pattern signal and a process of reducing the amount of weighting of the high-band pattern signal.

Second Embodiment

Next, a vehicle alarm device according to a second embodiment will be described in detail with reference to the drawings.

As described above, during travel of the vehicle, a road surface vibration, engine vibration, or the like is transmitted to the vehicle seat through the vehicle body and thus a travel vibration occurs in the vehicle. For this reason, the magnitude of a vibration felt on the vehicle seat varies with the road surface situation, travel speed, engine RPM, or the like. For example, when the travel speed is high, an alarm vibration generated by a vehicle alarm device may be masked by a travel vibration, such as a road surface vibration or engine vibration, transmitted to the seat and thus the driver may not become aware of the alarm. For this reason, it is conceivable that a technology that changes the volume level of an alarm sound in accordance with the travel speed of the vehicle will be applied to a vehicle alarm device that outputs a vibration from a speaker installed in the vehicle seat.

However, there is a limit to the reproducibility of the speaker. Even if the level of a signal to be inputted to the speaker is increased in accordance with the travel speed or the like of the vehicle, if the level of a vibration outputted from the speaker exceeds the reproducibility of the speaker (the level that can be outputted by the speaker), an alarm vibration having sufficient magnitude cannot be generated. Also, if a travel vibration transmitted to the vehicle seat with travel of the vehicle exceeds the magnitude of a vibration reproducible by the speaker, the alarm vibration would be masked by the travel vibration. For these reasons, even if the level of the signal to be inputted to the speaker is simply increased, disadvantageously, it is difficult to cause the user to recognize the alarm vibration.

In view of the foregoing, in the second embodiment, a vehicle alarm device will be described that is able to cause the user to recognize an alarm vibration in accordance with the travel situation of the vehicle considering the reproducibility of the speaker.

[Vehicle Alarm Device]

Figure 11:
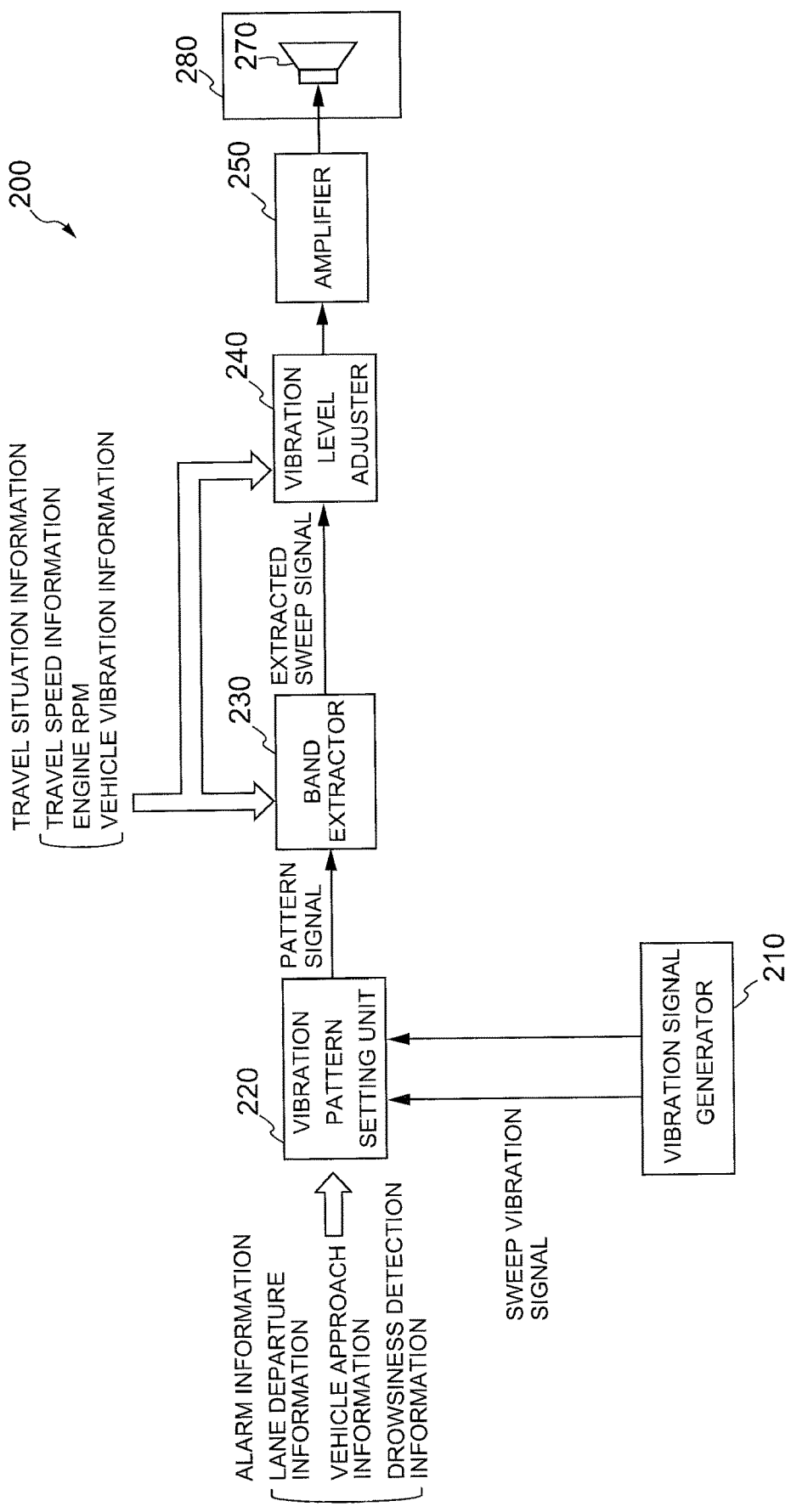
FIG. 11 is a block diagram showing a schematic configuration of a vehicle alarm device according to a second embodiment.

FIG. 11 is a block diagram showing a schematic configuration of the vehicle alarm device according to the second embodiment. A vehicle alarm device 200 includes a vibration signal generator (alarm signal generator) 210, a vibration pattern setting unit 220, a band extractor (travel situation information acquisition unit, alarm signal generator) 230, a vibration level adjuster (travel situation information acquisition unit, alarm signal generator) 240, an amplifier 250, a speaker (vibration generator) 270, and a vehicle seat seating portion (vibration transmission member) 280.

[Speaker]

The speaker 270 is a device for generating an alarm vibration. The speaker 270 used in the second embodiment has the same features as the speaker 30 used in the first embodiment. To generate an alarm vibration, the speaker 270 is preferably a speaker having high low-band sound output performance. In the second embodiment, a case will be described in which an exciter is installed in the vehicle seat seating portion 280 for the driver as the speaker 270.

[Amplifier]

The amplifier 250 amplifies a signal to be inputted to the speaker 270. The amplifier 250 used in the second embodiment has the same features as the amplifier 20 used in the first embodiment. The amplifier 250 receives an alarm signal generated by the vibration level adjuster 240, amplifies it, and then outputs the amplified alarm signal to the speaker 270.

[Vibration Signal Generator]

The vibration signal generator 210 generates a sweep vibration signal by sweeping a preset frequency range from the lower-limit value to the upper-limit value as one cycle. The preset frequency range covers a wide frequency band from a low band to a high band. A frequency range in which a vibration or sound can be reproduced is previously determined with respect to a typical speaker. Speakers are classified into low-band speakers, medium/high-band speakers, and others in accordance with the reproducible frequency ranges thereof. The vibration signal generator 210 determines the frequency range of a sweep vibration signal on the basis of the predetermined reproducibility of the speaker 270. The vibration signal generator 210 also determines the frequency range of a sweep vibration signal considering frequencies at which the person seated on the seating portion 280 of the vehicle seat can feel a vibration. The frequency range in which the seated person can feel a vibration is previously measured on the vehicle seat in which the speaker 270 is installed.

Figure 12A:
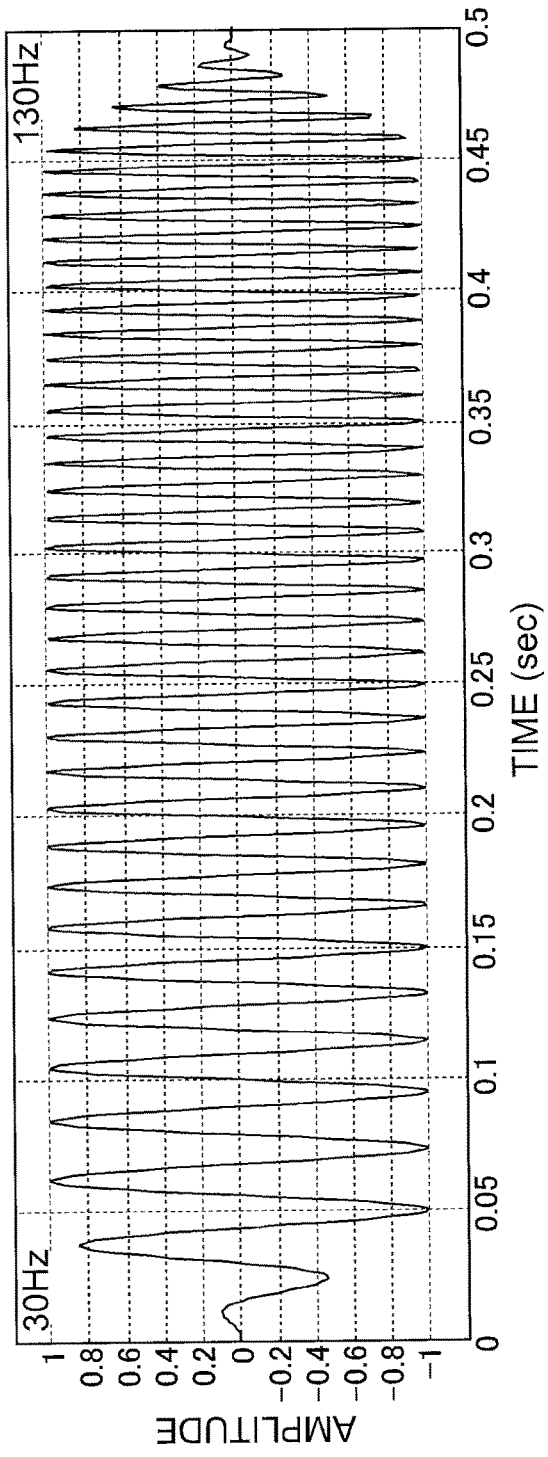
FIG. 12(a) is a graph showing amplitude characteristics corresponding to one cycle of a sweep vibration signal.
Figure 12B:
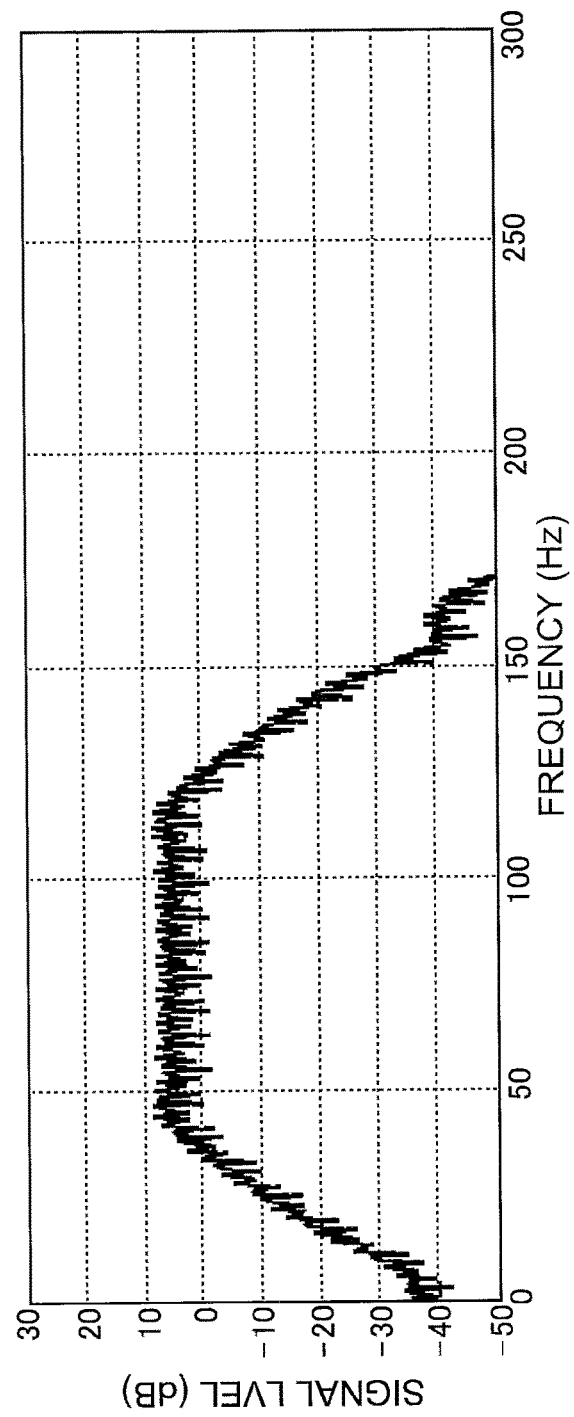
FIG. 12(b) is a graph showing frequency characteristics of the sweep vibration signal shown in FIG. 12(a)

The vibration signal generator 210 according to the second embodiment sets the lower-limit frequency of a sweep vibration signal to 30 Hz and the upper-limit frequency thereof to 130 Hz considering the frequency range in which the speaker 270 can generate a low-band vibration and the frequency range in which the seated person can feel a low-band vibration as a vibration. FIG. 12(a) shows amplitude characteristics of a sweep vibration signal having a one-cycle time of 0.5 sec. FIG. 12(b) shows frequency characteristics of the sweep vibration signal shown in FIG. 12(a). The sweep vibration signal generated by the vibration signal generator 210 is outputted to the vibration pattern setting unit 220.

[Vibration Pattern Setting Unit]

The vibration pattern setting unit 220 generates a pattern signal by changing the vibration pattern of the sweep vibration signal received from the vibration signal generator 210 in accordance with alarm details. As in the first embodiment, an alarm device (not shown) is connected to the vibration pattern setting unit 220. The alarm device is, for example, an electronic control unit or the like for danger information detection mounted on the vehicle. For example, the alarm device detects whether the traveling vehicle has departed from the lane, whether the own vehicle is quickly approaching another vehicle traveling in front, and whether the driver is in a drowsy state or other states. The alarm device determines the respective states from the detection results and outputs alarm information, such as lane departure information, vehicle approach information, and drowsiness detection information, to the vibration pattern setting unit 220.

Figure 13A:
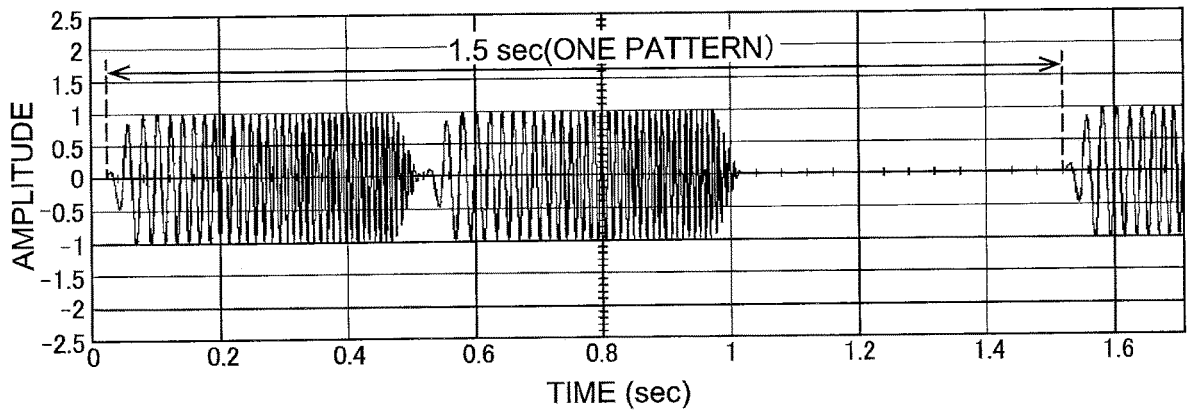
FIG. 13(a) is a graph showing amplitude characteristics of a pattern signal generated on the basis of lane departure information.

The vibration pattern setting unit 220 generates different pattern signals in accordance with details of the alarm information received from the alarm device. FIG. 13(a) is a graph showing an example of amplitude characteristics of a pattern signal generated on the basis of lane departure information. The amplitude characteristics shown in FIG. 13(a) show that the pattern signal has been outputted continuously in two cycles as a sweep vibration signal having a one-cycle time of 0.5 sec and then has continued for 0.5 sec as a signal having amplitude of zero. Accordingly, the one-pattern time of the generated pattern signal is 1.5 sec. The vibration pattern setting unit 220 continuously outputs the pattern signal shown in FIG. 13(a) to the band extractor 230 while receiving the lane departure information from the alarm device.

[Band Extractor]

The band extractor 230 extracts a predetermined band from the pattern signal received from the vibration pattern setting unit 220 by applying a band-limiting filter to the pattern signal. The pattern signal from which the predetermined band has been extracted by the band extractor 230 is referred to as the extracted sweep signal.

As with the vibration level setting unit 70 of the first embodiment, a travel situation detector (not shown) is connected to the band extractor 230 and vibration level adjuster 240. For example, the travel situation detector detects the travel speed of the vehicle as travel speed information, detects the engine RPM as engine RPM information, or detects the magnitude of a vibration as vehicle vibration information using a vibration sensor mounted on the vehicle body under the seat. The travel situation detector outputs the detected information as travel situation information to both the band extractor 230 and vibration level adjuster 240.

In the second embodiment also, as in the first embodiment, the travel speed information, engine RPM information, or vehicle vibration information corresponding to the travel situation information corresponds to information that causes an increase or decrease in the travel vibration in the vehicle. Also, the travel situation information corresponds to information whose value varies with the travel situation of the vehicle.

The band extractor 230 determines the cutoff frequency of the band-limiting filter on the basis of the travel situation information received from the travel situation detector. In the second embodiment, a case will be described in which the band extractor 230 determines the cutoff frequency on the basis of travel speed information, which is an example of travel situation information.

For example, the band extractor 230 according to the second embodiment has a configuration in which a low-band pass filter and a high-band pass filter are cascaded in two stages. Each filter has 256 taps and is an FIR filter having the minimum phase. Since finite-length filters are used as the low-band filter and high-band pass filter, the frequency range of the extracted sweep signal is continuously changed and almost no unusual noise occurs even if the cutoff frequencies of the filters are changed.

Figure 13B:
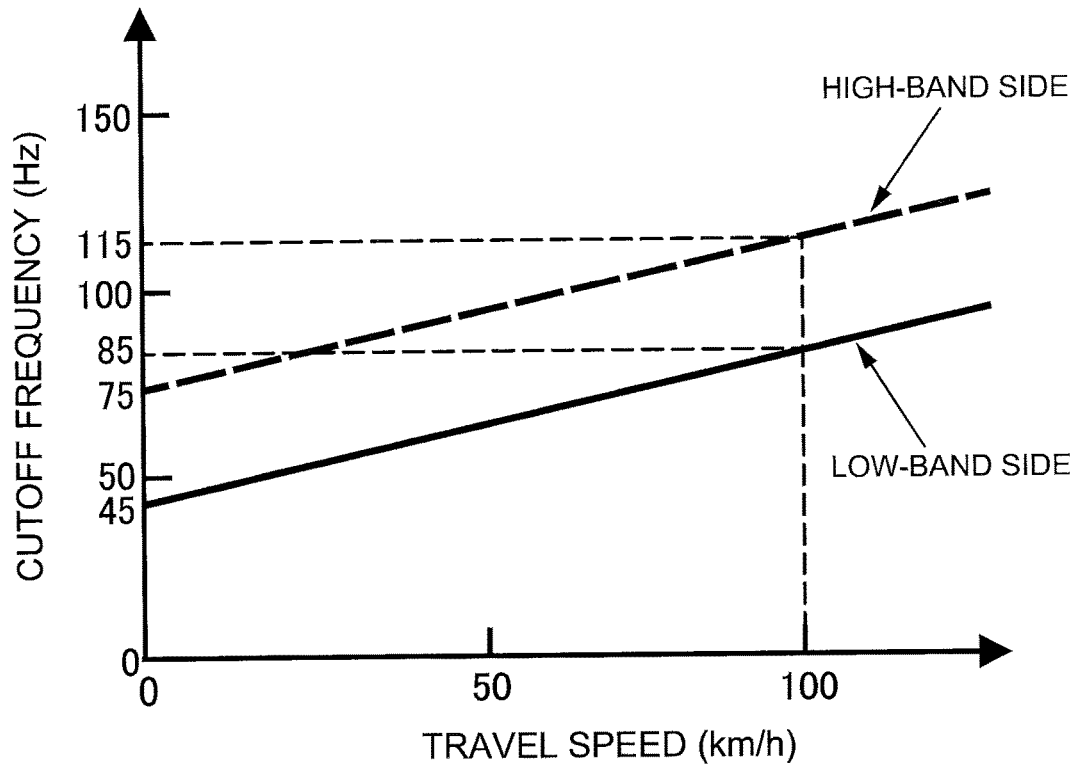
FIG. 13(b) is a graph showing the correspondences between the travel speed of the vehicle and low band-side and high band-side cutoff frequencies.

FIG. 13(b) is a graph showing the correspondences between the travel speed of the vehicle obtained on the basis of the travel speed information and the low band-side and high band-side cutoff frequencies. The band-limiting filter extracts a band (a band in which signal output is allowed) from the signal having a frequency range from the low band-side cutoff frequency to the high band-side cutoff frequency. By changing the low band-side cutoff frequency and high band-side cutoff frequency in accordance with the travel speed in this manner, the frequency range of an alarm vibration outputted from the speaker 270 can be changed.

As shown in FIG. 13(b), the low band-side cutoff frequency and high band-side cutoff frequency are increased or reduced in proportion to the travel speed of the vehicle. More specifically, as the travel speed of the vehicle increases, the high band-side and low band-side cutoff frequencies are set or changed to high values and an extracted sweep signal having high frequency components is generated. On the other hand, as the travel speed of the vehicle decreases, the high band-side and low band-side cutoff frequencies are set or changed to low values and an extracted sweep signal having low frequency components is generated. In FIG. 13(b), when the travel speed is 0 km/h, the low band-side cutoff frequency is set to 45 Hz and the high band-side cutoff frequency is set to 75 Hz. Also, when the travel speed is 100 km/h, the low band-side cutoff frequency is set to 85 Hz and the high band-side cutoff frequency is set to 115 Hz.

Figure 14A:
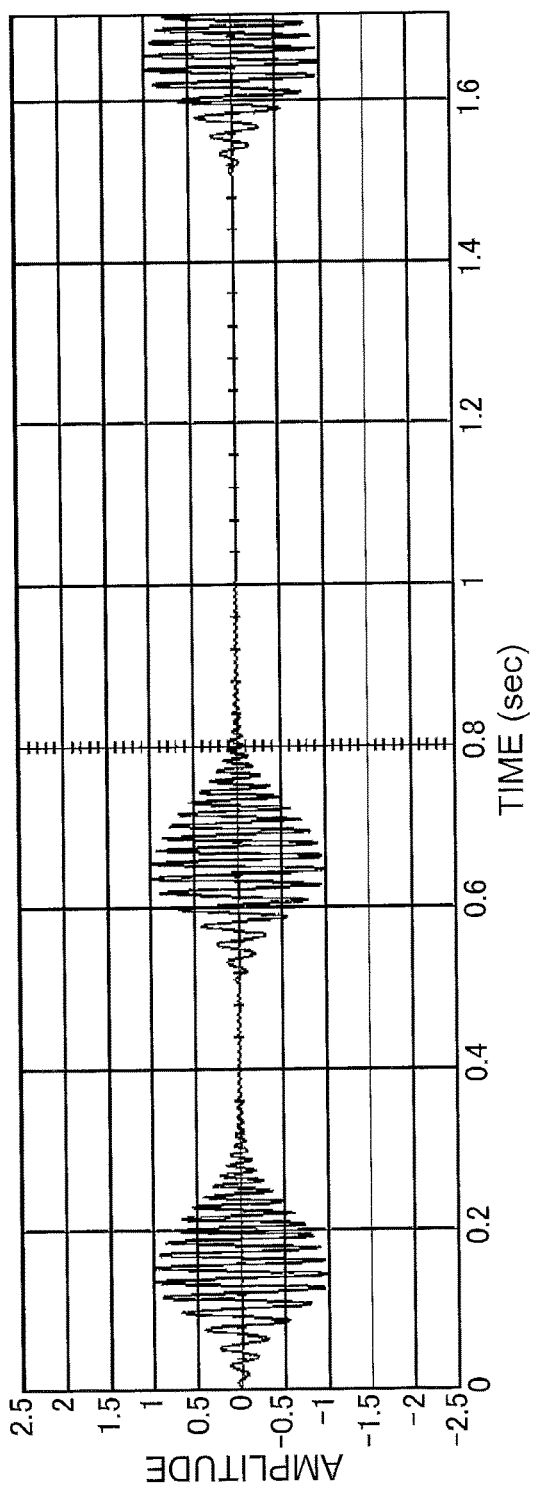
FIG. 14(a) is a graph showing amplitude characteristics of an extracted sweep signal obtained by extracting a frequency band in accordance with the travel speed when the travel speed of the vehicle is 0 km/h.
Figure 14B:
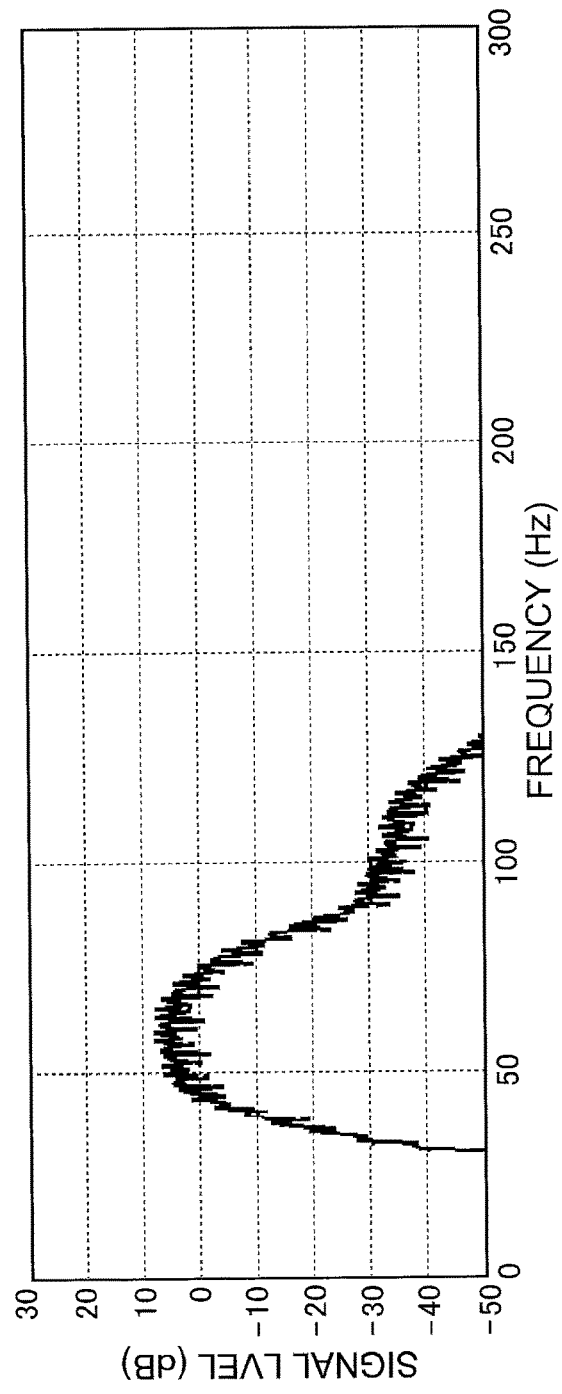
FIG. 14(b) is a graph showing frequency characteristics.
Figure 15A:
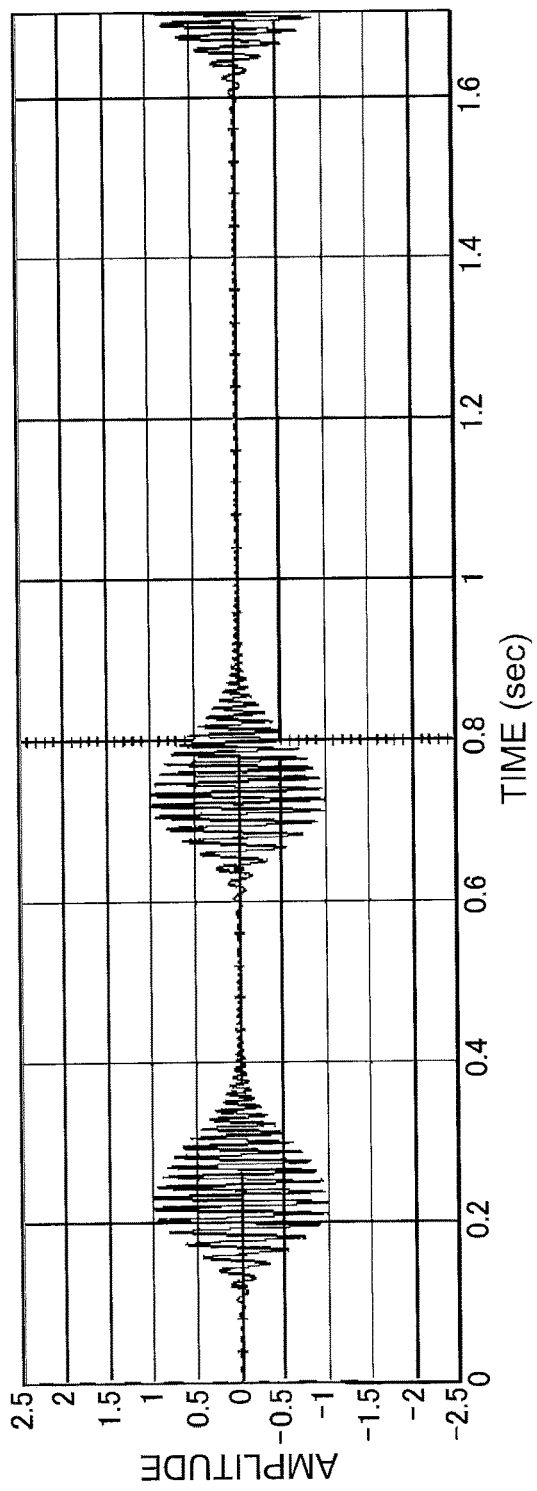
FIG. 15(a) is a graph showing amplitude characteristics of an extracted sweep signal obtained by extracting a frequency band in accordance with the travel speed when the travel speed of the vehicle is 30 km/h.
Figure 15B:
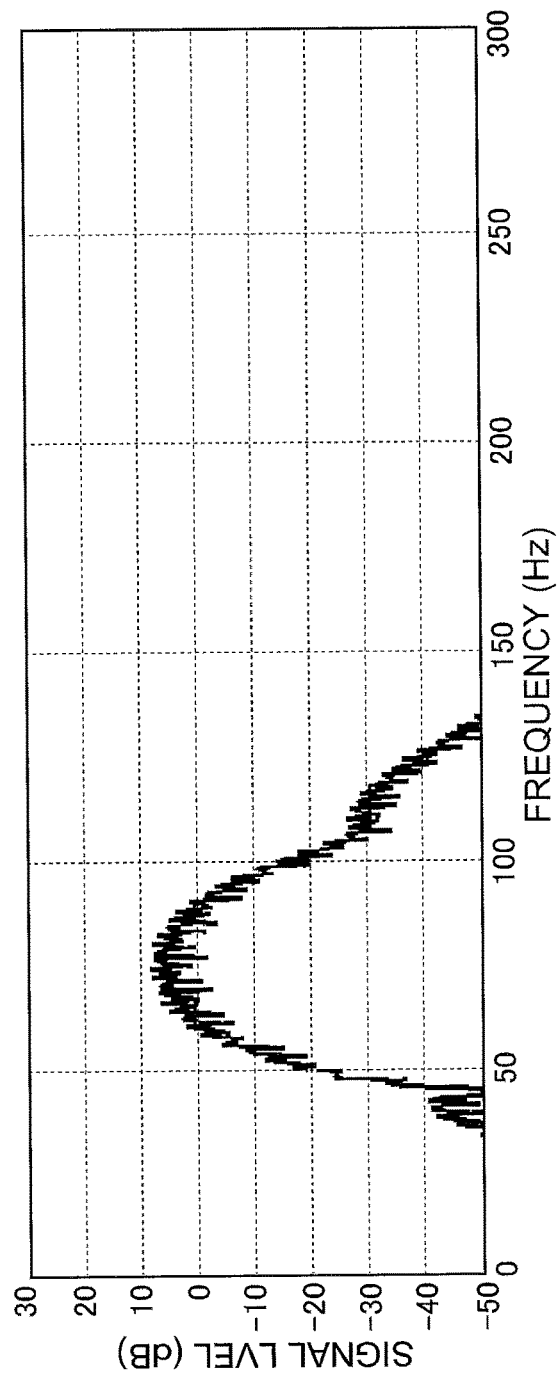
FIG. 15(b) is a graph showing frequency characteristics.
Figure 16A:
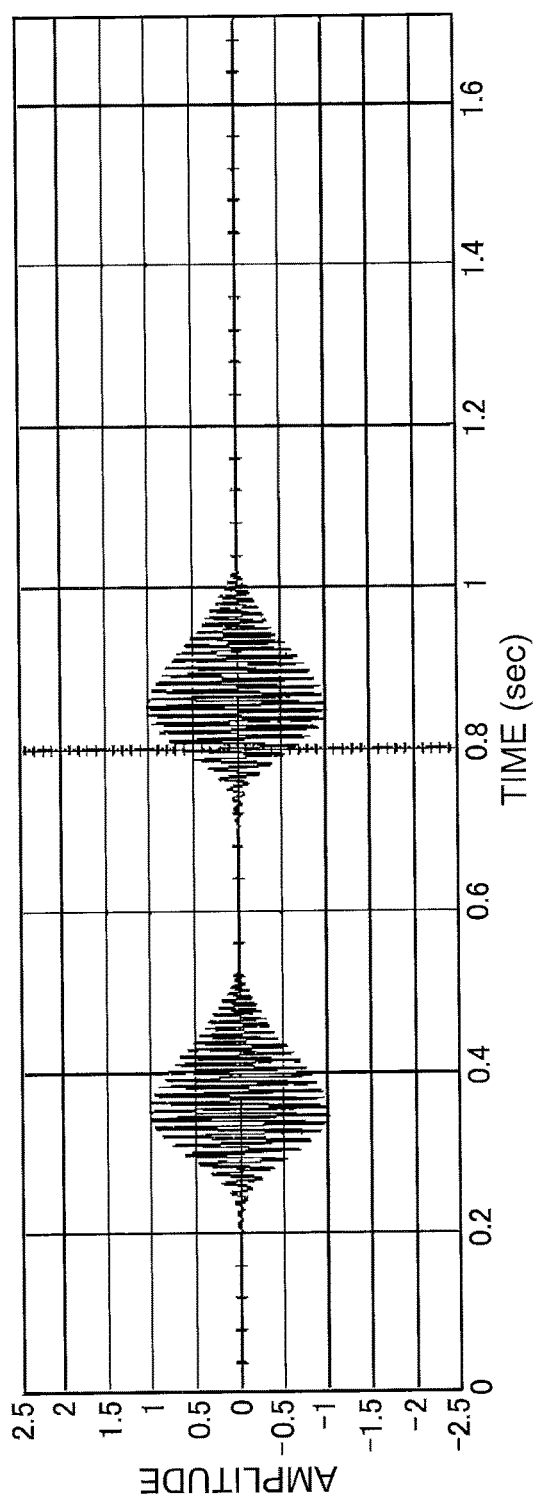
FIG. 16(a) is a graph showing amplitude characteristics of an extracted sweep signal obtained by extracting a frequency band in accordance with the travel speed when the travel speed of the vehicle is 100 km/h.
Figure 16B:
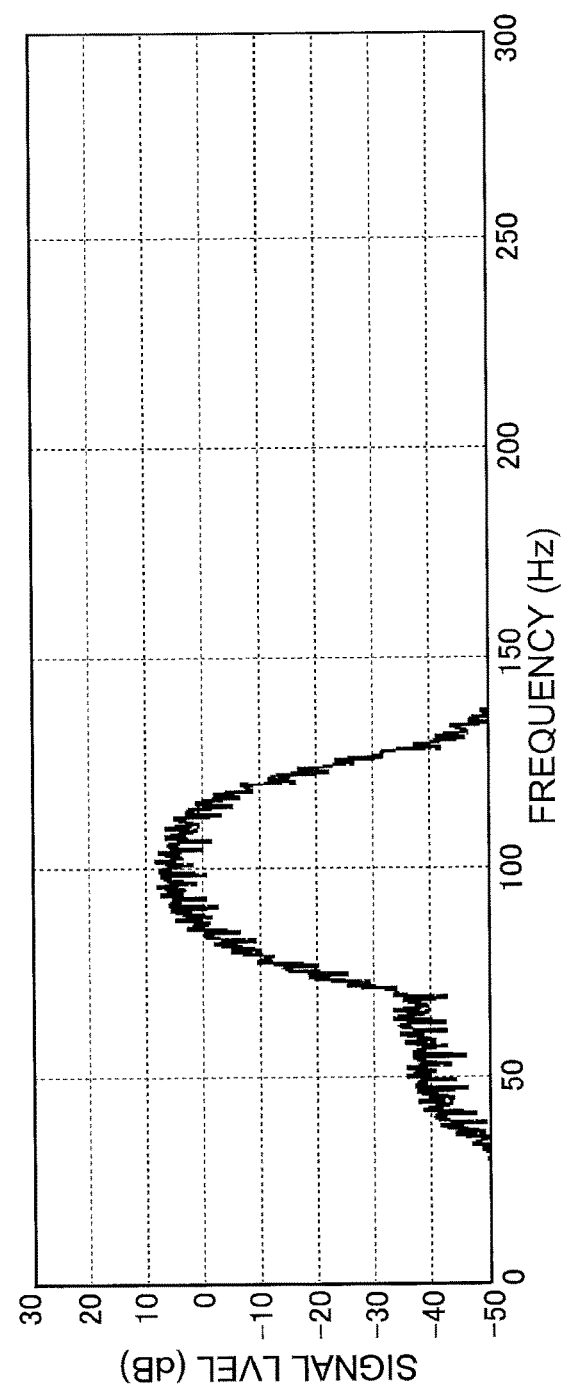
FIG. 16(b) is a graph showing frequency characteristics.

FIGS. 14(a), 15(a), and 16(a) are graphs showing amplitude characteristics of extracted sweep signals obtained by extracting the frequency band in accordance with the travel speed of the vehicle. FIGS. 14(b), 15(b), and 16(b) are graphs showing frequency characteristics of the extracted sweep signals obtained by extracting a frequency band in accordance with the travel speed of the vehicle. FIGS. 14(a) and 14(b) show a case in which the travel speed is 0 km/h, FIGS. 15(a) and 15(b) show a case in which the travel speed is 30 km/h, and FIGS. 16(a) and 16(b) show a case in which the travel speed is 100 km/h.

As shown in FIGS. 14(a), 14(b), 15(a), 15(b), 16(a), and 16(b), as the travel speed increases, the band extractor 230 extracts higher-band frequency components from the frequency components of the pattern signal received from the vibration pattern setting unit 220. By changing the cutoff frequencies so that the low band-side cutoff frequency and high band-side cutoff frequency are increased or reduced in proportion to the travel speed of the vehicle as shown in FIG. 13(b), the frequency range of the extracted sweep signal can be controlled in accordance with the travel speed.

FIG. 13(b) shows a case in which the low band-side cutoff frequency and high band-side cutoff frequency are changed in accordance with the travel speed such that the amounts of change of the respective cutoff frequencies (the inclinations of the cutoff frequencies with respect to the travel speed) become the same. However, the amounts of change of the low band-side cutoff frequency and high band-side cutoff frequency need not necessarily be the same.

Figure 17A:
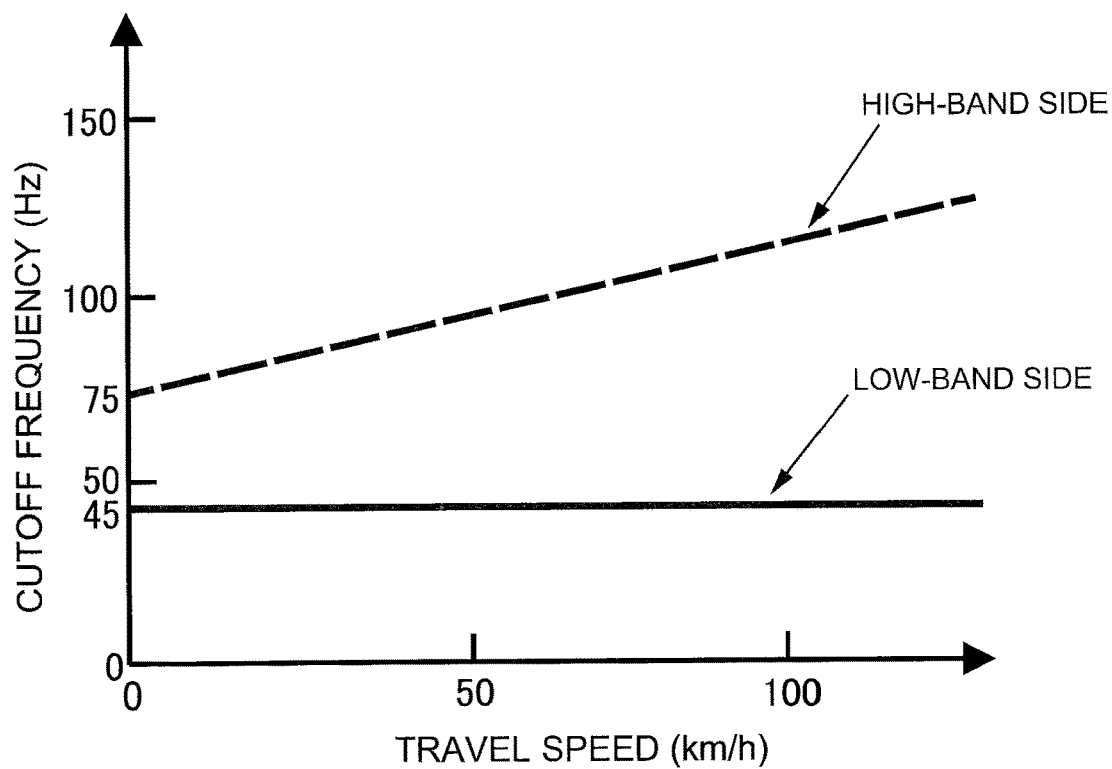
FIG. 17(a) is a graph showing the correspondences between the travel speed of the vehicle and the low band-side and high band-side cutoff frequencies.

For example, as shown in FIG. 17(a), the high band-side cutoff frequency may be changed in accordance with increases or decreases in the travel speed, while the low band-side cutoff frequency may be set to a constant frequency regardless of the travel speed. FIG. 18(a) is a graph showing amplitude characteristics of an extracted sweep signal obtained by extracting frequency components on the basis of the amount of change of the cutoff frequency shown in FIG. 17(a) when the travel speed is 100 kin/h. FIG. 18(b) is a graph showing frequency characteristics of the extracted sweep signal obtained by extracting frequency components on the basis of the amount of change of the cutoff frequency shown in FIG. 17(a) when the travel speed is 100 km/h.

By setting the low band-side cutoff frequency to the constant value (45 Hz) and increasing the value of the high band-side cutoff frequency in accordance with the travel speed, it is possible to generate an alarm vibration on the basis of an extracted sweep signal including frequency components closer to the low band-side cutoff frequency during low-speed travel and to generate an alarm vibration on the basis of an extracted sweep signal whose frequency is changed over a low-to-high wide band during high-speed travel.

The extracted sweep signal, from which the band has been extracted (limited) by the band extractor 230, is outputted to the vibration level adjuster 240.

[Vibration Level Adjuster]

The vibration level adjuster 240 weights the amplitude of the extracted sweep signal, from which the band has been extracted by the band extractor 230, in accordance with the travel situation information. In this weighting process, the vibration level adjuster 240 determines the weight level (signal level (amplitude value)) considering the limit of the reproducibility of the speaker 270.

Figure 17B:
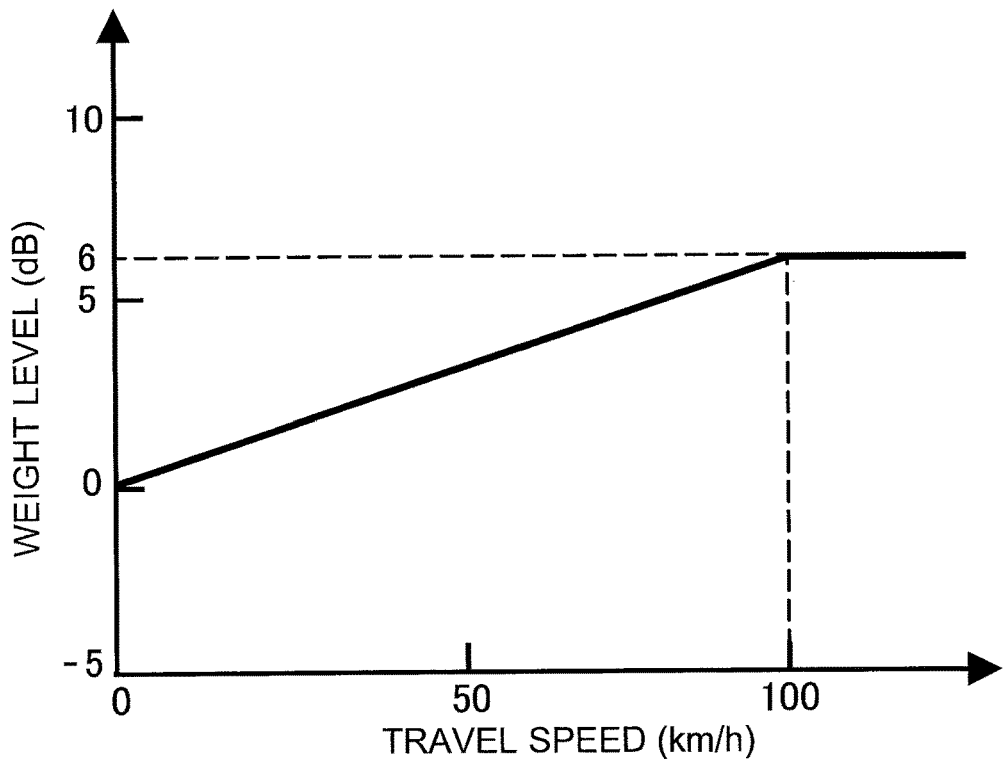
FIG. 17(b) is a graph showing the correspondence between the travel speed and the weight level.

FIG. 17(b) is a graph showing the correspondence between the travel speed and the weight level. FIG. 17(b) shows a case in which the settable weight level (signal level: dB) is 6 dB considering the reproduction capacity (the upper limit of reproducibility) of the speaker 270. In the graph shown in FIG. 17(b), the value of the weight level is increased or reduced in proportion to the travel speed of up to 100 km/h. When the travel speed is 0 km/h, the weight level is set to 0 dB; when the travel speed is 100 km/h, the weight level is set to 6 dB. Once the travel speed reaches 100 km/h, the weight level is maintained at (limited to) 6 dB even if the travel speed increases. Since the weight level is maintained at (limited to) 6 dB even if the travel speed exceeds 100 km/h, a signal having a level exceeding the reproducibility of the speaker 270 can be prevented from being inputted to the speaker 270.

FIG. 19(a) is a graph showing amplitude characteristics of a signal obtained when the vibration level adjuster 240 weights the amplitude of the extracted sweep signal shown in FIG. 16(a) when the travel speed is 100 km/h. FIG. 19(b) is a graph showing frequency characteristics of the signal obtained when the vibration level adjuster 240 weights the amplitude of the extracted sweep signal shown in FIG. 16(a) when the travel speed is 100 km/h. Hereafter, the signal weighted by the vibration level adjuster 240 is referred to as the weighted sweep signal.

A comparison between the amplitude value of the weighted sweep signal shown in FIG. 19(a) and the amplitude value of the extracted sweep signal shown in FIG. 16(a) reveals that the amplitude value of the weighted sweep signal is twice that of the extracted sweep signal. Also, a comparison between the level of the weighted sweep signal shown in FIG. 19(b) and the level of the extracted sweep signal shown in FIG. 16(b) reveals that the level of the weighted sweep signal is higher than that of the extracted sweep signal by 6 dB.

The weighted sweep signal, whose amplitude has been weighted by the vibration level adjuster 240, is outputted to the amplifier 250. The weighted sweep signal is amplified by the amplifier 250 and then outputted to the speaker 270, which then generates an alarm vibration on the seating portion 280 of the vehicle seat.

[Occurrence State of Alarm Vibration]

Figure 20A:
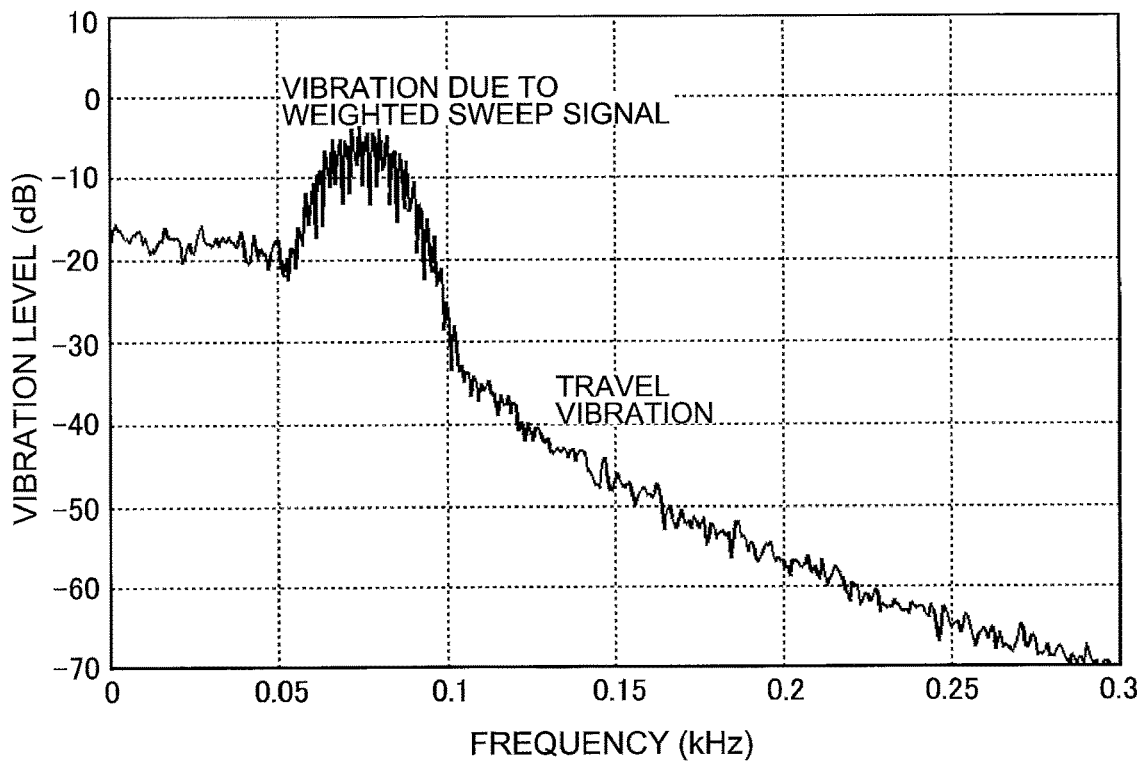
FIG. 20(a) is a graph showing frequency characteristics of a vibration generated on the vehicle seat when a band extraction process is performed using a cutoff frequency corresponding to 30 km/h when the travel speed is 30 km/h.

FIG. 20(a) is a graph showing frequency characteristics of a vibration generated on the upper surface of the vehicle seat when a band extraction process is performed using a cutoff frequency corresponding to 30 km/h when the travel speed is 30 km/h.

As the vehicle travels, travel noise or the like may enter the vehicle and vibrate the vehicle seat as a travel vibration. As described above, a travel vibration tends to be high in level at low-band frequencies and to decrease in level as the frequency increases toward the high band-side. Also, a travel vibration tends to increase in level in the entire frequency range as the travel speed increases.

As shown in FIG. 20(a), when the travel speed is relatively low, for example, about 30 km/h, the level of the travel vibration only reaches up to about −18 dB in a low band (0.05 kHz or less). For this reason, when the weighted sweep signal from which a band of about 0.05 to 0.1 kHz has been extracted is outputted from the speaker 270, a sufficient difference in level is ensured between the weighted sweep signal and the travel vibration, allowing the seated person to recognize the difference between the travel vibration and alarm vibration on the basis of the difference between the vibrations on the vehicle seat. As a result, when the travel speed is low, the seated person can be caused to feel the alarm vibration having a low frequency band and to recognize the occurrence of the alarm.

Also, when the travel speed is 30 km/h, a weight of about several dB is assigned, as shown in FIG. 17(*b*). This weight level is set considering the reproduction capacity (the upper limit of reproducibility) of the speaker 270. Thus, the level of the weighted sweep signal to be inputted to the speaker 270 can be prevented from exceeding the reproducibility of the speaker 270. As a result, the seated person can be caused to feel a sufficiently recognizable alarm vibration while controlling the level of the alarm vibration outputted from the speaker 270 to within the reproducibility of the speaker 270.

Figure 20B:
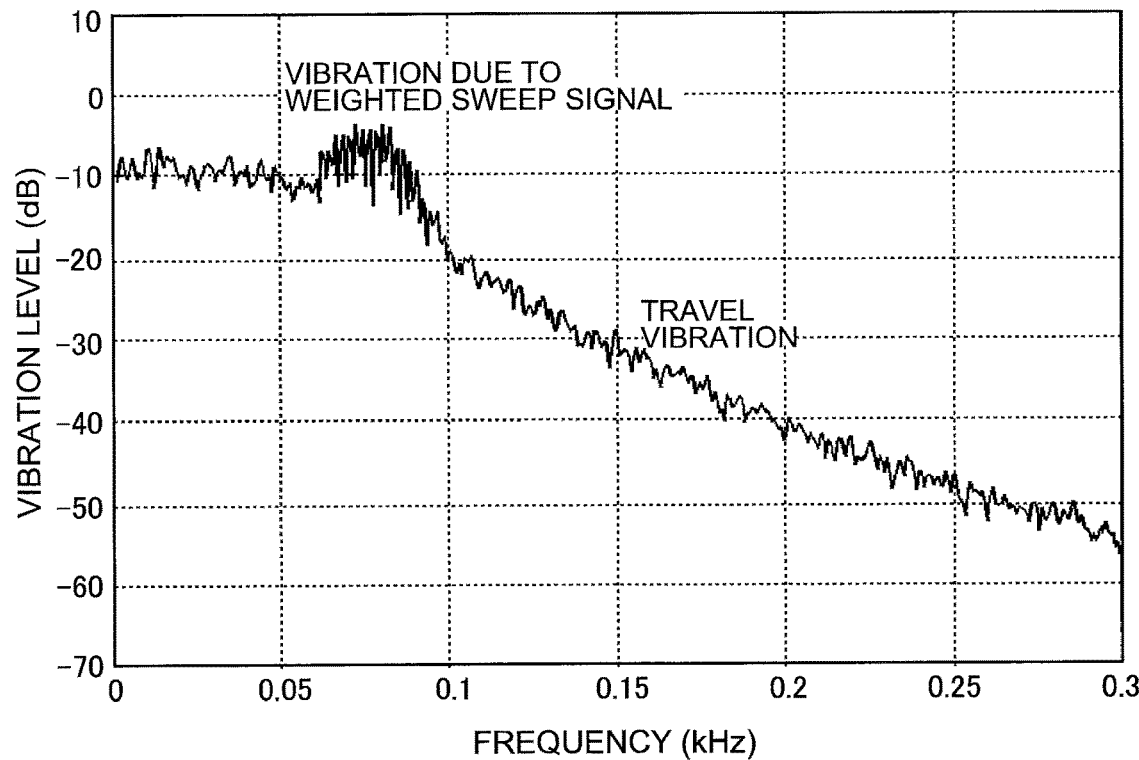
FIG. 20(b) is a graph showing frequency characteristics of a vibration generated on the vehicle seat when a band extraction process is performed using a cutoff frequency corresponding to 30 km/h when the travel speed is 100 km/h.

FIG. 20(*b*) is a graph showing frequency characteristics of a vibration generated on the vehicle seat when the band extractor 230 performs a band extraction process using a cutoff frequency corresponding to 30 km/h when the travel speed is 100 km/h. A comparison between FIG. 20(*b*) and FIG. 20(*a*) reveals that the travel vibration when the travel speed is 100 km/h shown in FIG. 20(*b*) is higher in level than the travel vibration when the travel speed is 30 km/h shown in FIG. 20(*a*). For this reason, even if the weighted sweep signal of 0.05 to 0.1 kHz extracted using the cutoff frequency corresponding to 30 km/h is outputted from the speaker 270, the level of the alarm vibration would be embedded in the travel vibration. This makes it difficult to ensure a sufficient difference in level between the alarm vibration and the travel vibration and thus makes it difficult to cause the person seated on the vehicle seat to recognize the alarm vibration.

To ensure a sufficient difference in level with respect to the travel vibration, it is also conceivable that the level of the alarm vibration will be increased. However, as described above, the level of the weighted sweep signal, whose amplitude has been weighted by the vibration level adjuster 240, is set considering the reproduction capacity (the upper limit of reproducibility) of speaker 270. For this reason, when the level of the alarm vibration is increased, the vibration level may exceed the upper limit of the reproducibility of the speaker 270, resulting in breakage or distortion of the speaker 270.

Figure 21A:
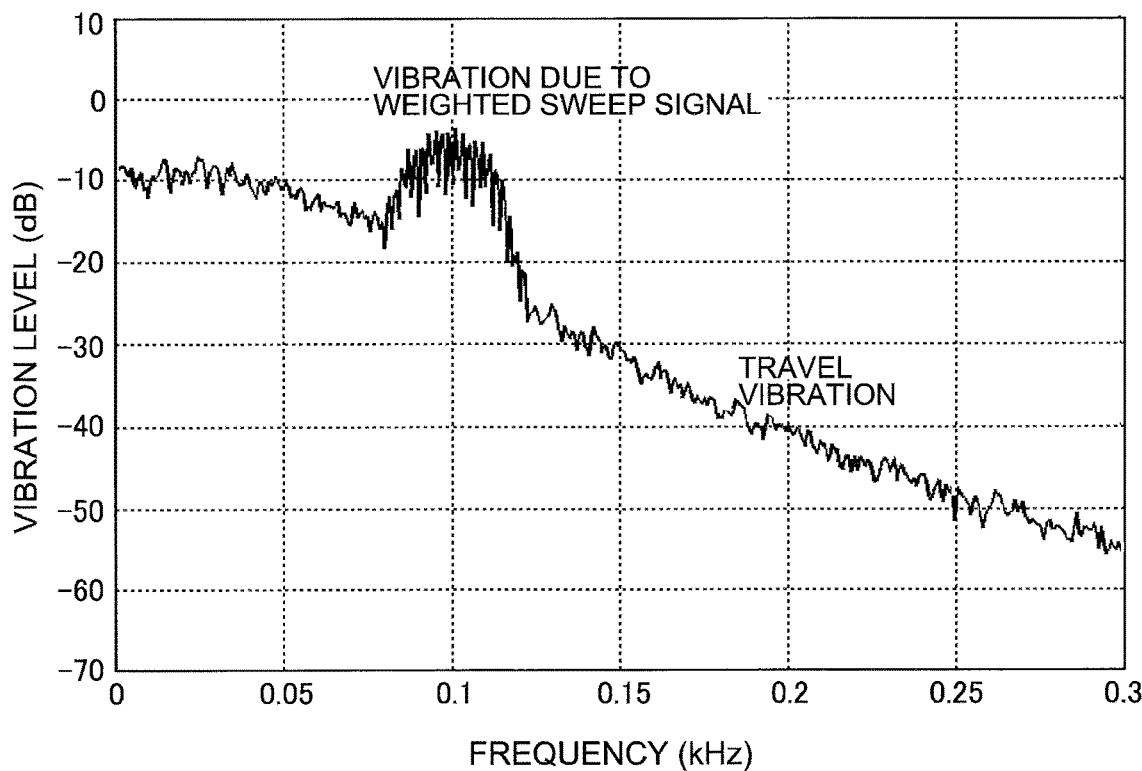
FIG. 21(a) is a graph showing frequency characteristics of a vibration generated on the vehicle seat on the basis of an extracted sweep signal obtained by performing a band extraction process using a cutoff frequency corresponding to 100 km/h when the travel speed is 100 km/h.
Figure 21B:
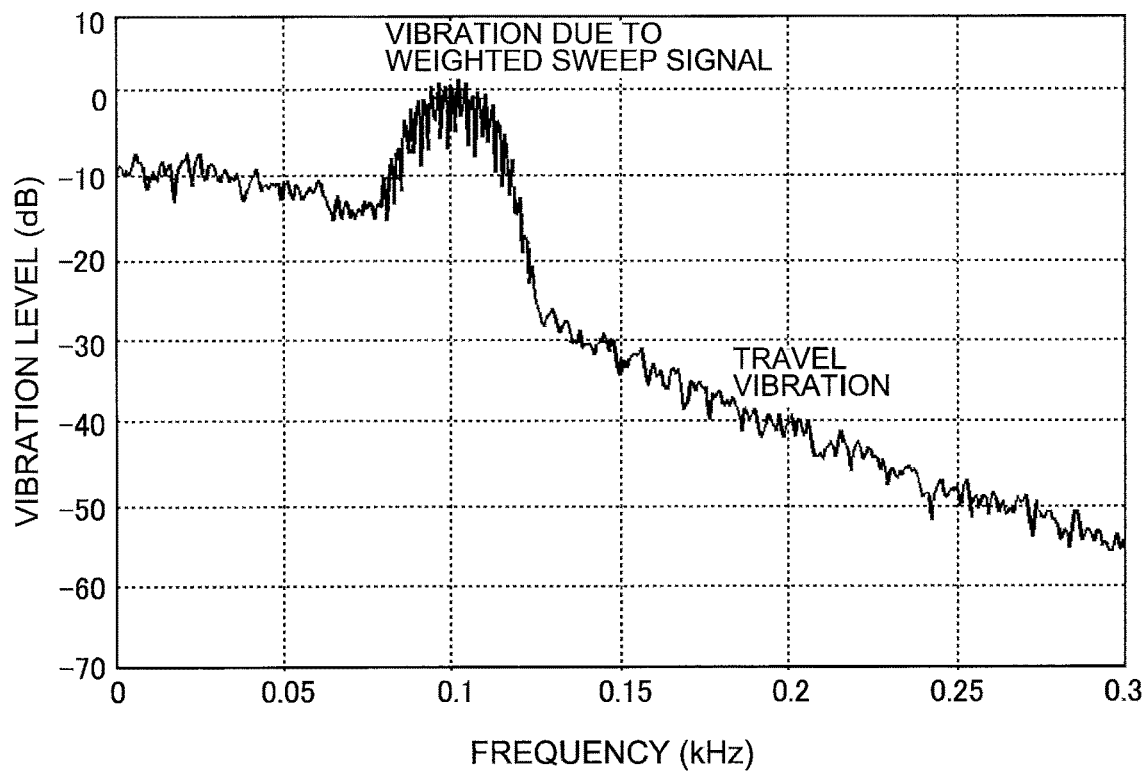
FIG. 21(b) is a graph showing frequency characteristics of a vibration generated on the vehicle seat when an amplitude weighting process is performed on an extracted sweep signal obtained by extracting a band extraction process using a cutoff frequency corresponding to 100 km/h when the travel speed is 100 km/h.

FIG. 21(*a*) is a graph showing frequency characteristics of a vibration generated on the seating portion 280 when an extracted sweep signal from which a band has been extracted using a cutoff frequency corresponding to 100 km/h is outputted from the speaker 270 when the travel speed is 100 km/h. Note that FIG. 21(*a*) shows frequency characteristics of a vibration in a case in which the amplitude has not been weighted by the vibration level adjuster 240.

As described above, FIG. 21(*a*) shows that the travel vibration tends to increase in level in the entire frequency range as the travel speed increases. For this reason, in FIG. 21(*a*), the level of the travel vibration shows a higher value than that in FIG. 20(*a*). However, a travel vibration tends to be high in level at low-band frequencies and to decrease in level as the frequency increases toward the high band-side. As shown in FIG. 21(*a*), the band extractor 230 is able to change the frequency range of the alarm vibration generated on the vehicle seat to a high frequency band (around 0.1 kHz) by extracting a band using a cutoff frequency corresponding to a travel speed of 100 km/h. Thus, a sufficient difference in level can be ensured between the vibration based on the weighted sweep signal and the travel vibration. As a result, when the travel speed is high, the seated person can be caused to feel a vibration by generating a vibration on the basis of the alarm vibration from which a high frequency band has been extracted.

FIG. 21(*b*) shows frequency characteristics of a vibration generated on the seating portion 280 when the vibration level adjuster 240 weights the amplitude of an extracted sweep signal from which a band has been extracted using a cutoff frequency corresponding to 100 km/h when the travel speed is 100 km/h. The weight level for weighting is 6 dB set when the travel speed is 100 km/h. This 6 dB is set considering the reproduction capacity (the upper limit of reproducibility) of the speaker 270. Even if a weight of 6 dB is assigned, the upper limit of the reproducibility of the speaker 270 is not exceeded. As shown in FIG. 21(*b*), by weighting the extracted sweep signal (alarm vibration), a sufficient difference in level can be ensured between the weighted sweep signal and the travel vibration, compared to that shown in FIG. 21(*a*). As seen above, when the travel speed is high, an alarm vibration is generated on the basis of the alarm signal from which a band in a high frequency range has been extracted. Thus, the seated person can be caused to feel a larger vibration, and the distinguishability of the alarm vibration can be improved.

In the vehicle alarm device 200 according to the second embodiment, the band extractor 230 changes the frequency range of the extracted sweep signal for generating an alarm vibration, in accordance with the travel speed, and the vibration level adjuster 240 weights the extracted sweep signal considering the reproduction capacity (the upper limit of reproducibility) of the speaker 270. Thus, the level of the alarm vibration can be effectively increased within the reproducibility of the speaker 270 without uselessly increasing the level of the signal to be inputted to the speaker 270, and a highly distinguishable alarm vibration can be generated.

The vehicle alarm device and vehicle alarm method according to the present invention have been described in detail with reference to the first and second embodiments. When the travel speed or the like is relatively low (e.g., 30 km/h), the vehicle alarm device and vehicle alarm method according to the embodiments of the present invention set the frequency of the signal to be inputted to the vibration generator, such as a speaker, to a low frequency on the basis of the travel situation information, such as the travel speed.

As shown in FIGS. 10(*a*) and 10(*b*), the level of the travel vibration in a low frequency band when the travel speed is relatively low tends to be lower than the vibration level when the travel speed is relatively high. For this reason, when the travel speed or the like is relatively low, even if the frequency of the signal to be inputted to the vibration generator, such as the speaker 30 or 270, is set to a low frequency and the frequency band in which the alarm vibration is generated is set to a low frequency band, a sufficient difference in level can be ensured between the travel vibration and the alarm vibration. By generating a low-band alarm vibration when the travel speed or the like is relatively low, the person (user) seated on the seating portion 280 can be caused to feel the vibration and to recognize the alarm.

On the other hand, when the travel speed or the like is relatively high (e.g., 100 km/h), the vehicle alarm device and vehicle alarm method according to the embodiments of the present invention set the frequency of the signal to be inputted to the vibration generator, such as a speaker, to a high frequency on the basis of the travel situation information, such as the travel speed. As described above, when the travel speed is relatively high, the entire level of the travel vibration is high. For this reason, in a low frequency band, it is difficult to ensure a sufficient difference in level between the travel vibration and the alarm vibration.

However, as shown in FIGS. 10(a) and 10 (b), the travel vibration tends to decrease in level in the form of a fall to the right as the frequency increases. Accordingly, in a high frequency range, it is relatively easy to ensure a sufficient difference in level between the travel vibration and the alarm vibration. As seen above, when the travel speed or the like is relatively high, the frequency band in which an alarm vibration is generated is changed to a high frequency band by setting the frequency of the signal to be inputted to the vibration generator to a high frequency. Thus, the person (user) seated on the seating portion 280 can be caused to feel the vibration and to recognize the alarm.

In particular, the vehicle alarm device 100 according to the first embodiment previously detects the resonant frequencies that allow for generation of a larger vibration on the vehicle seat or the like, considering vibration characteristics of the vibration transmission member, such as the vehicle seat. The vehicle alarm device 100 then generates an alarm vibration by setting the resonant frequencies specific to the vehicle seat or the like to the frequency of the signal to be inputted to the vibration generator, such as the speaker 30, and thus is able to generate a sufficiently strong alarm vibration on the vehicle seat or the like using an input signal having a low level. For this reason, in order to generate an alarm vibration having strength that allows the person (user) seated on the driver's seat to recognize the alarm vibration, it is possible to generate an effective vibration using an input signal having a lower level.

Also, the vehicle alarm device 200 according to the second embodiment changes the frequency range of the signal to be inputted to the speaker 270 to a frequency range in which a sufficient difference in level can be ensured between the alarm vibration and the travel vibration while performing weighting considering the limit of the reproducibility of the speaker 270. Thus, a sufficient difference in level can be ensured between the alarm vibration and the travel vibration while preventing output of an alarm vibration having a level that exceeds the reproducibility of the speaker 270. As a result, the person (user) seated on the driver's seat can be caused to feel a sufficiently strong vibration and to recognize the alarm.

In the first and second embodiments, the vibration transmission member has been described using the seating portions 90, 280 of the vehicle seat as examples. However, the vibration transmission member only has to be a member that allows the user to feel a vibration during travel of the vehicle and is not limited to the vehicle seat or the seating portion 90 or 280 thereof. For example, the vibration transmission member may be a member in the vehicle, such as a steering wheel, brake pedal, accelerator pedal, or arm rest, that is able to transmit a vibration to the user during travel of the vehicle.

As the signal to be inputted to the speaker or the like, the signal based on the resonant frequency described in the first embodiment or the band-extracted sweep signal described in the second embodiment may be selectively used in accordance with the travel speed or the like of the vehicle. For example, when the travel speed is a preset speed or less, one of the signal based on the resonant frequency and the band-extracted sweep signal may be set as a signal to be inputted to the speaker or the like, and when the travel speed exceeds the preset speed, the other of the signal based on the resonant frequency and the band-extracted sweep signal may be set as a signal to be inputted to the speaker or the like.

Even when generating an alarm vibration using the resonant frequency, it is preferred to adjust the level of the signal to be inputted to the speaker so that the reproducibility of the speaker is not exceeded. By adjusting the level of the signal to be inputted so that the reproducibility of the speaker is not exceeded (so that the signal level falls within the range in which the speaker is capable of outputting (generating) a vibration), a vibration having a sufficient level can be generated while preventing distortion or the like of the alarm vibration or breakage of the speaker, and thus the user can be caused to easily recognize the occurrence of the alarm.

In the second embodiment, the case has been described in which the vibration signal generator 210 of the vehicle alarm device 200 generates a sweep signal and the band extractor 230 thereof extracts a band from the sweep signal in accordance with the value of the travel situation information. However, the sweep signal used by the vehicle alarm device 200 need not necessarily be a sweep signal from which a band is extracted. For example, when the value of the travel situation information is high, the sweep signal only has to include high-band frequency components and the signal levels in a high band only have to be higher than the signal levels in other bands. Also, when the value of the travel situation information is low, the sweep signal only has to include low-band frequency components and the signal levels in a low band only have to be higher than the signal levels in other bands.

As described above, when the value of the travel situation information is high, even if an alarm vibration is generated in a low frequency band, it is difficult to ensure a difference in level between the travel vibration and the alarm vibration. For this reason, when the value of the travel situation information is high, the level of the sweep signal in a high band is set to a higher level than the signal levels of in other bands. Thus, it is possible to generate an alarm vibration including high-band frequency components that easily ensure a difference in level between the travel vibration and alarm vibration, as a larger vibration. As a result, the user can be caused to easily feel the alarm vibration and to easily recognize the occurrence of the alarm.

On the other hand, when the value of the travel situation information is low, the entire level of the travel vibration tends to decrease. Even if the alarm vibration includes low-band frequency components, a difference in level is easily ensured between the travel vibration and the alarm vibration. For this reason, when the value of the travel situation information is low, the level of the sweep signal in a low band is set to a higher level than the signal levels in other bands. Thus, it is possible to generate an alarm vibration including low-band frequency components that easily ensure a difference in level between the travel vibration and alarm vibration, as a larger vibration. As a result, the user can be caused to easily feel the alarm vibration and to easily recognize the occurrence of the alarm.

REFERENCE SIGNS LIST

10 sound characteristics measurement unit
20, 250 amplifier
30, 27 speaker (vibration generator)
40 microphone 50, 210 vibration signal generator (alarm signal generator)
60, 220 vibration pattern setting unit
70 vibration level setting unit (travel situation information acquisition unit, alarm signal generator)
90 memory
90, 280 vehicle seat seating portion (vibration transmission member)
100, 200 vehicle alarm device
230 band extractor (travel situation information acquisition unit, alarm signal generator)
240 vibration level adjuster (travel situation information acquisition unit, alarm signal generator)

The invention claimed is:

1. A vehicle alarm device comprising:
a vibration generator configured to generate an alarm vibration having a frequency corresponding to a frequency of a received alarm signal;
a vibration transmission member configured to transmit the alarm vibration generated by the vibration generator to a user;
a travel situation information acquisition unit configured to acquire travel situation information which is information that causes an increase or decrease in magnitude of a travel vibration in a vehicle, wherein when a value of the travel situation information increases or decreases in accordance with a travel situation of the vehicle, the magnitude of the travel vibration increases or decreases; and
an alarm signal generator configured to generate the alarm signal such that when the value of the travel situation information acquired by the travel situation information acquisition unit is high, a signal to be inputted to the vibration generator includes at least a high-band frequency and such that when the value of the travel situation information acquired by the travel situation information acquisition unit is low, the signal to be inputted to the vibration generator includes at least a low-band frequency, wherein
the alarm signal generator generates the alarm signal by extracting a band from a frequency range in which the alarm vibration can be felt by the user,
when the value of the travel situation information acquired by the travel situation information acquisition unit is high, the alarm signal generator sets a frequency range from which the band is to be extracted, to a high frequency range, and
when the value of the travel situation information acquired by the travel situation information acquisition unit is low, the alarm signal generator sets the frequency range from which the band is to be extracted, to a low frequency range.

2. The vehicle alarm device according to claim 1, wherein the travel situation information is one of a value of a travel speed of the vehicle, a value of engine revolutions per minute of the vehicle, and a value of a vibration sensor detected in the vehicle.

3. The vehicle alarm device according to claim 1, wherein
when the value of the travel situation information acquired by the travel situation information acquisition unit increases, the alarm signal generator changes a value of a high band-side cutoff frequency in the frequency range from which the band is to be extracted, to a higher frequency, and
when the value of the travel situation information acquired by the travel situation information acquisition unit decreases, the alarm signal generator changes the value of the high band-side cutoff frequency to a lower frequency.

4. The vehicle alarm device according to claim 1, wherein
when the value of the travel situation information acquired by the travel situation information acquisition unit increases, the alarm signal generator changes a value of a low band-side cutoff frequency in the frequency range from which the band is to be extracted, to a higher frequency, and
when the value of the travel situation information acquired by the travel situation information acquisition unit decreases, the alarm signal generator changes the value of the low band-side cutoff frequency to a lower frequency.

5. The vehicle alarm device according to claim 1, wherein the alarm signal generator adjusts a level of the alarm signal so that the level does not exceed a level of a vibration that the vibration generator is capable of generating.

6. A vehicle alarm method performed by a vehicle alarm device that generates an alarm vibration having a frequency corresponding to a frequency of a received alarm signal using a vibration generator and transmits the alarm vibration to a user through a vibration transmission member, the vehicle alarm method comprising:
a travel situation information acquisition step of acquiring, by a travel situation information acquisition unit, travel situation information which is information that causes an increase or decrease in magnitude of a travel vibration in a vehicle, wherein when a value of the travel situation information increases or decreases in accordance with a travel situation of the vehicle, the magnitude of the travel vibration increases or decreases;
an alarm signal generation step of generating, by an alarm signal generator, the alarm signal such that when the value of the travel situation information acquired in the travel situation information acquisition step is high, a signal to be inputted to the vibration generator includes at least a high-band frequency and such that when the value of the travel situation information acquired in the travel situation information acquisition step is low, the signal to be inputted to the vibration generator includes at least a low-band frequency; and
an alarm vibration generation step of generating, by the vibration generator, the alarm vibration on the basis of the alarm signal generated in the alarm signal generation step, wherein
in the alarm signal generation step, the alarm signal generator generates the alarm signal by extracting a band from a frequency range in which the alarm vibration can be felt by the user, and
when the value of the travel situation information acquired in the travel situation information acquisition step is high, the alarm signal generator sets a frequency range from which the band is to be extracted, to a high frequency range, and
when the value of the travel situation information acquired in the travel situation information acquisition step is low, the alarm signal generator sets the frequency range from which the band is to be extracted, to a low frequency range.

7. The vehicle alarm method according to claim 6, wherein the travel situation information is one of a value of a travel speed of the vehicle, a value of engine revolutions per minute of the vehicle, and a value of a vibration sensor detected in the vehicle.

8. The vehicle alarm method according to claim 6, wherein
in the alarm signal generation step, the alarm signal generator changes a value of a high band-side cutoff frequency in the frequency range from which the band is to be extracted, to a higher frequency when the value of the travel situation information acquired in the travel situation information acquisition step increases and changes the value of the high band-side cutoff frequency to a lower frequency when the value of the travel situation information acquired in the travel situation information acquisition step decreases.

9. The vehicle alarm method according to claim 6, wherein
in the alarm signal generation step, the alarm signal generator changes a value of a low band-side cutoff frequency in the frequency range from which the band is to be extracted, to a higher frequency when the value of the travel situation information acquired in the travel situation information acquisition step increases and changes the value of the low band-side cutoff frequency to a lower frequency when the value of the travel situation information acquired in the travel situation information acquisition step decreases.

10. The vehicle alarm method according to claim 6, wherein in the alarm signal generation step, the alarm signal generator adjusts a level of the alarm signal so that the level does not exceed a level of a vibration that the vibration generator is capable of generating.

* * * * *